(12) United States Patent
Wang et al.

(10) Patent No.: US 7,586,231 B2
(45) Date of Patent: *Sep. 8, 2009

(54) END CAP FOR SEGMENTED STATOR

(75) Inventors: Weirong Wang, Chesterfield, MO (US); John Scott Rose, Alton, IL (US); Paul G. Michaels, St. Louis, MO (US); Mark E. Carrier, Wildwood, MO (US); Jason J. Jurkowski, St. Peters, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/193,476

(22) Filed: Aug. 18, 2008

(65) Prior Publication Data

US 2008/0296996 A1    Dec. 4, 2008

Related U.S. Application Data

(63) Continuation of application No. 10/806,560, filed on Mar. 23, 2004, now Pat. No. 7,414,347.

(51) Int. Cl.
*H02K 3/34* (2006.01)
*H02K 3/38* (2006.01)

(52) U.S. Cl. .................. 310/260; 310/71; 310/194; 310/259

(58) Field of Classification Search .............. 310/260, 310/71, 194, 259
See application file for complete search history.

(56) References Cited

U.S. PATENT DOCUMENTS

| | | | |
|---|---|---|---|
| 2,688,103 A | 8/1954 | Sheldon | |
| 2,894,157 A | 7/1959 | Morrill | |
| 3,792,299 A | 2/1974 | Hallerback | |
| 4,161,669 A | 7/1979 | Aimar | |
| 4,481,435 A | 11/1984 | Loforese | |
| 4,492,344 A | 1/1985 | Baumann et al. | |
| 4,893,041 A | 1/1990 | Snider et al. | |
| 5,698,923 A | 12/1997 | Scherzinger et al. | |
| 5,786,651 A | 7/1998 | Suzuki | |

(Continued)

FOREIGN PATENT DOCUMENTS

DE    19920127    11/2000

(Continued)

*Primary Examiner*—Burton Mullins
(74) *Attorney, Agent, or Firm*—Harness, Dickey & Pierce, P.L.C.

(57) ABSTRACT

A stator for an electromagnetic machine includes a plurality of discrete and individually wound stator segments having end caps positioned on the segments. The end caps have legs for positioning the end cap on the segments with an interference fit. The end caps have angled surfaces to facilitate winding of wire on the segments. The end caps have male and female couplings that mate together to couple adjacent segments together. The end caps have fingers and slots for aligning the segments on substantially the same plane. The end caps have wire isolation features, including hooks, shelves and ledges, for separating the interconnect wires routed on the stator to electrically interconnect the segments. The segments include scalloped contours on their outer edges for draining oil, and the end caps have passages for draining oil.

10 Claims, 17 Drawing Sheets

U.S. PATENT DOCUMENTS

| | | |
|---|---|---|
| 5,900,687 A | 5/1999 | Kondo et al. |
| 6,034,461 A | 3/2000 | Sun |
| 6,057,625 A | 5/2000 | Stockman et al. |
| 6,066,905 A | 5/2000 | Wright et al. |
| 6,081,059 A | 6/2000 | Hsu |
| 6,127,753 A | 10/2000 | Yamazaki et al. |
| 6,177,751 B1 | 1/2001 | Suzuki et al. |
| D445,762 S | 7/2001 | Shida et al. |
| 6,274,957 B1 | 8/2001 | Mahn et al. |
| 6,472,792 B1 | 10/2002 | Jack et al. |
| 6,509,665 B1 | 1/2003 | Nishiyama et al. |
| 6,541,889 B2 | 4/2003 | Moroto et al. |
| 6,584,813 B2 | 7/2003 | Peachee et al. |
| 6,590,310 B2 | 7/2003 | Takano |
| 6,744,166 B2 | 6/2004 | Harter et al. |
| 6,787,966 B2 | 9/2004 | Haga |
| 6,844,653 B2 | 1/2005 | Kolomeitsev et al. |
| 6,876,118 B2 | 4/2005 | Enomoto et al. |
| 6,924,570 B2 | 8/2005 | De Filippis et al. |
| 6,984,911 B2 | 1/2006 | Horie et al. |
| 7,034,419 B2 | 4/2006 | Kabasawa et al. |
| D525,196 S | 7/2006 | Rose et al. |
| 7,116,023 B2 | 10/2006 | Wang et al. |
| D539,219 S | 3/2007 | Wang et al. |
| D539,737 S | 4/2007 | Wang et al. |
| 7,382,075 B2 | 6/2008 | Wang et al. |
| 7,414,347 B2 | 8/2008 | Wang et al. |
| 2002/0047473 A1 | 4/2002 | Laurrent et al. |
| 2004/0006865 A1 | 1/2004 | Hartsfield, Jr. et al. |
| 2004/0051417 A1 | 3/2004 | Yamazaki et al. |
| 2004/0084988 A1 | 5/2004 | Sheeran et al. |
| 2004/0155549 A1 | 8/2004 | Marioni |
| 2004/0183388 A1 | 9/2004 | Rittmeyer |
| 2007/0114877 A1 | 5/2007 | Wang et al. |

FOREIGN PATENT DOCUMENTS

| | | |
|---|---|---|
| DE | 20204507 | 6/2002 |
| EP | 64105 | 11/1982 |
| EP | 993095 | 4/2000 |
| EP | 1024581 | 8/2000 |
| EP | 1193829 | 4/2002 |
| JP | 04317534 | 11/1992 |
| JP | 09191588 | 7/1997 |
| JP | 9322439 | 12/1997 |
| JP | 11018331 | 1/1999 |
| JP | 2000078789 | 3/2000 |
| JP | 2001008395 | 1/2001 |
| JP | 2001103699 | 4/2001 |
| JP | 2002101596 | 4/2002 |
| JP | 2002209359 | 7/2002 |
| JP | 2002233091 | 8/2002 |
| JP | 2002291186 | 10/2002 |
| JP | 2003088031 | 3/2003 |
| JP | 2003219593 | 7/2003 |
| JP | 2003333782 | 11/2003 |
| JP | 2004056873 | 2/2004 |
| JP | 2004080962 | 3/2004 |
| WO | 95/12912 | 5/1995 |
| WO | 98/44616 | 10/1998 |
| WO | 02/47240 | 6/2002 |
| WO | 03/021744 | 3/2003 |
| WO | 03/021745 | 3/2003 |
| WO | 03/021746 | 3/2003 |
| WO | 03/096515 | 11/2003 |
| WO | 2004/042893 | 5/2004 |
| WO | 2005/096469 | 10/2005 |
| WO | 2005/101611 | 10/2005 |

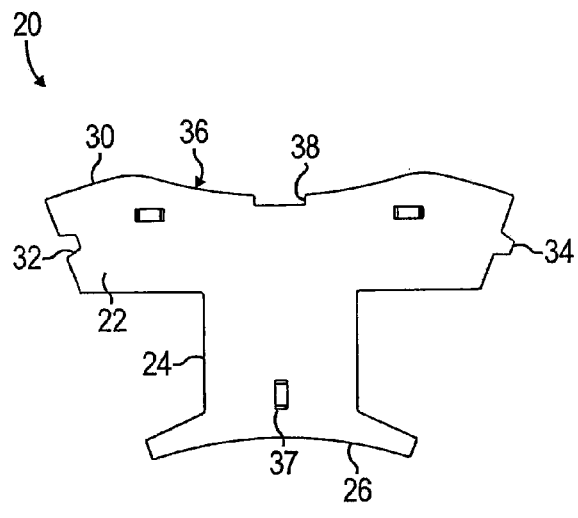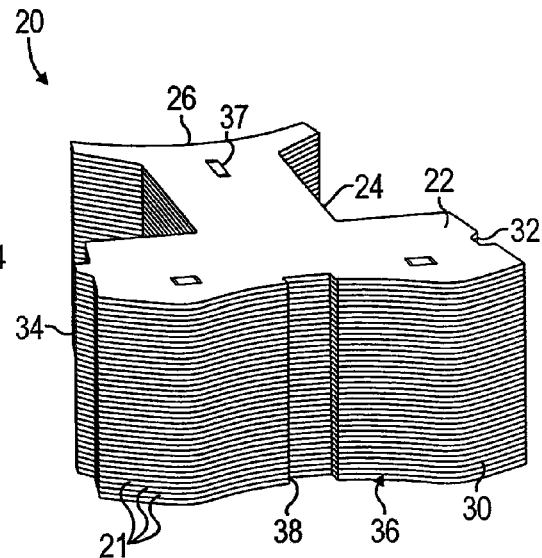
FIG. 3A  FIG. 3B
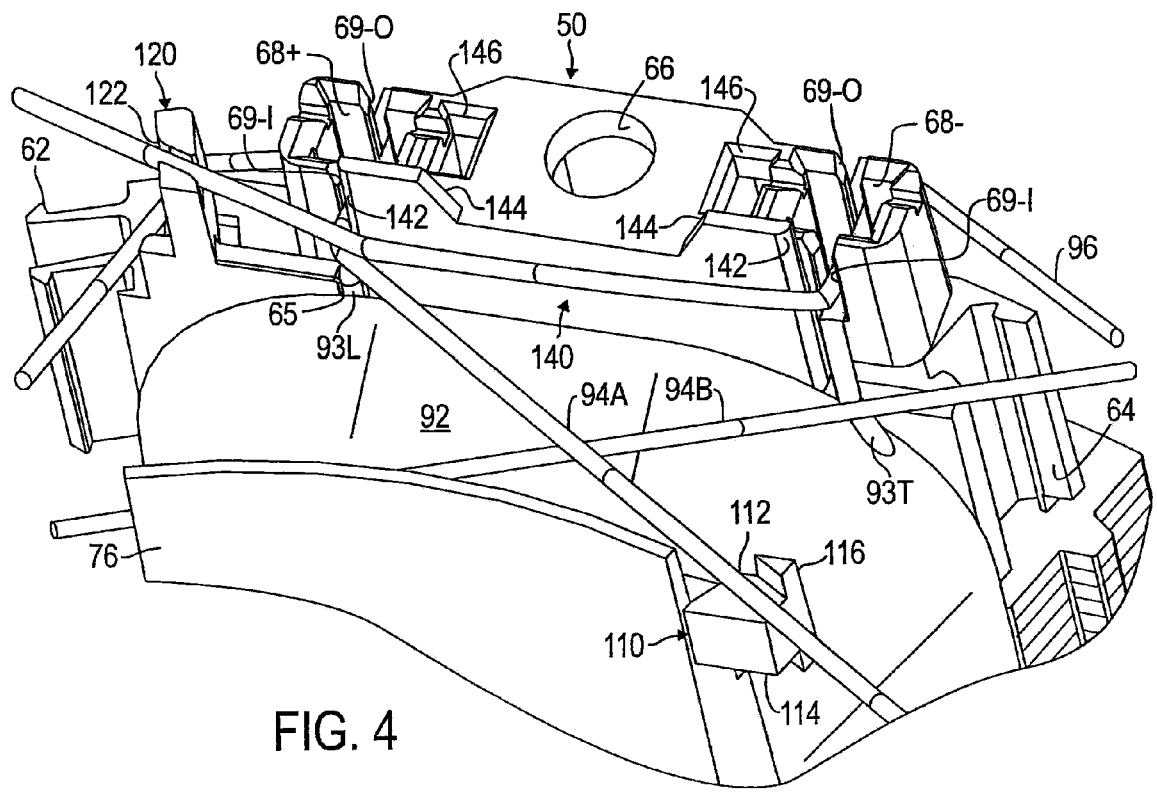
FIG. 4

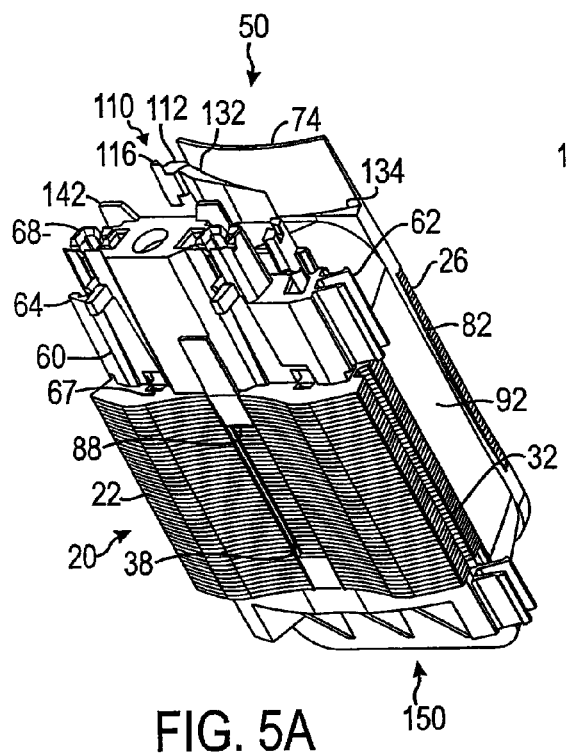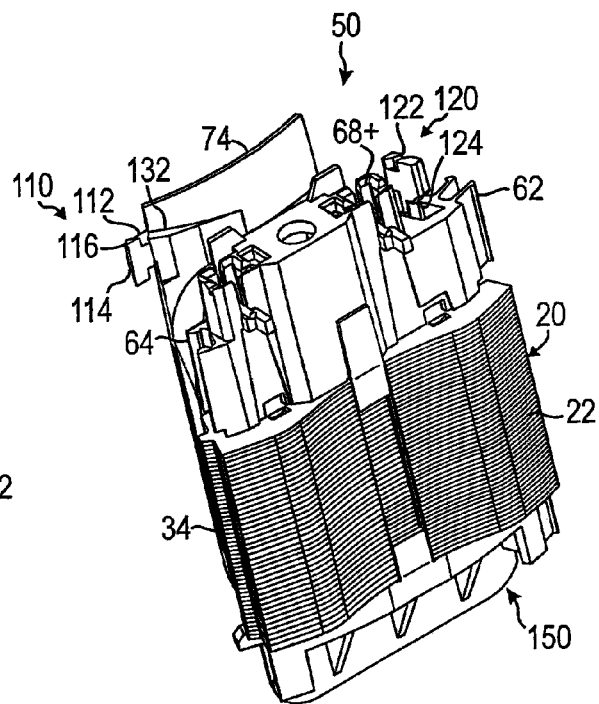
FIG. 5A    FIG. 5B
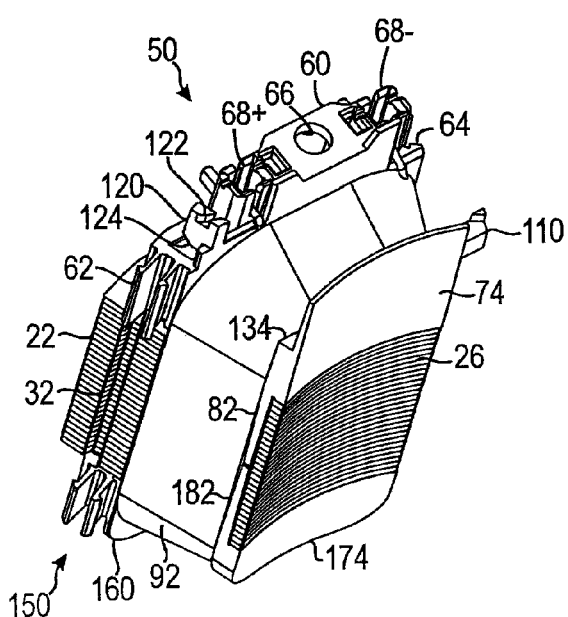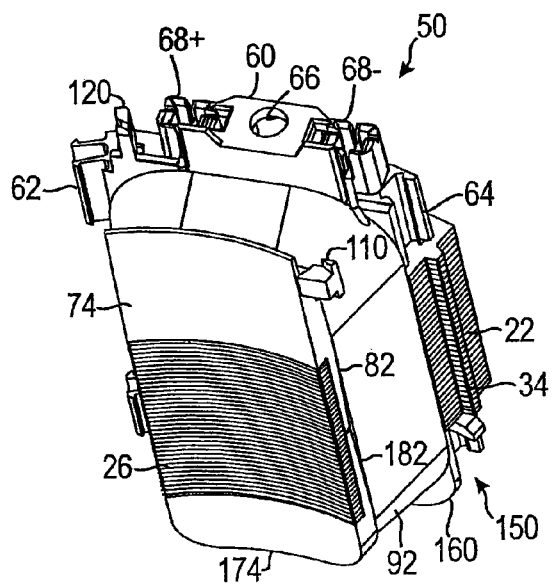
FIG. 5C    FIG. 5D

END CAP FOR SEGMENTED STATOR

CROSS-REFERENCE TO RELATED APPLICATIONS

This application is a continuation of U.S. patent application Ser. No. 10/806,560 filed Mar. 23, 2004, the entire disclosure of which is incorporated herein by reference.

FIELD OF THE PRESENT DISCLOSURE

The subject matter of the present disclosure relates to stator assemblies for electromagnetic machines. More particularly, the subject matter of the present disclosure relates to "loose" segmented stator assemblies having discrete and individually wound stator segments and end caps. In one example, the "loose" segmented stator assembly of the present disclosure can be used in a hermetic motor of a compressor for a refrigeration system.

BACKGROUND OF THE PRESENT DISCLOSURE

Segmented stators for use in electromagnetic machines, such as hermetic compressor motors of a refrigeration system, are known in the art. The segmented stator assemblies typically include a plurality of segments that form the stator of the motor. The stator is typically contained within a shell, and a rotor and shaft are positioned for rotation within a bore of the stator. Each segment of the stator includes a yoke portion and a tooth portion. As is known in the art of electromagnetic machines, such as induction motors, brushless permanent magnet (BPM) motors, and switched reluctance (SR) motors, the stator teeth are wound with magnet wires to form winding coils having a plurality of phases.

End caps fit on the ends of segments of a stator to facilitate the placement of wire on the segments. For example, U.S. Pat. No. 6,584,813 to Peachee et al. and entitled "Washing machine including a segmented stator switched reluctance motor," which is incorporated herein by reference in its entirety, discloses a segmented stator assembly that uses end caps on the segments. In addition, U.S. Pat. No. 2,688,103 to Sheldon; U.S. Pat. No. 2,894,157 to Morrill; U.S. Pat. No. 6,127,753 to Yamazaki; U.S. Pat. No. 6,509,665 to Nishiyama et al and U.S. Patent Application No. 2002/0084716 to Harter et al. disclose various examples of end caps for stators. The prior art end caps are typically glued to the segments, and winding coils are wound about the tooth portions of each segment and on portions of the end caps. Therefore, any problems with the end caps can produce poor winding characteristics in the winding coils, such as undesirable overlap of the winding coils or inefficient density of the winding coils about the tooth portions.

Segmented stators require various manufacturing steps to interconnect all the individually wound coils on the segments to form the phase windings. To interconnect the winding coils of the stator, it is known in the art to use a printed circuit board to interconnect the various winding coils of the stator. The printed circuit board is generally circular and has a plurality of terminal pads that connect to terminal pins on each end cap of the stator.

Rather than using a printed circuit board, interconnect wires can be used to connect the various winding coils of opposing electrical phases (voltages). Ends of the interconnect wires can be welded or soldered to terminal pins on the end caps of the stator, such as disclosed in U.S. Pat. No. 2,688,103 to Sheldon. The interconnect wire can be routed on the stator in several different ways. In one example, the interconnect wires can be routed around the outside portions of the segments. It is known in the art to provide hooks on the outboard side of a stator for routing the wires to route interconnect wires on the outside portion of the stator. In a compressor motor, however, routing wires on the outside portion of the stator is not desirable.

In another example, the interconnect wires can be routed within the inside portion of the stator. It is known in the art to use a stitcher ring to guide the wires to route interconnect wires on the inside portion of the stator. For example, a stitcher ring, having part no. 280138 and manufactured by Emerson Electric Co, is used in motors to route interconnect wires. The stitcher ring is a disc with a central opening for passage of a rotor shaft. The stitcher ring positions on a lead-end of the stator and fits partially over the bore of the stator. A plurality of hooks are provided on one side of the stitcher ring and are used to route wire between winding coils. In another example, U.S. Pat. No. 5,900,687 to Kondo et al. discloses an end plate having grooves for arranging the conducting wires between the coils of the various phases. The end plate is fixed onto an upper portion of the winding coils of the stator in the area of the bore.

Because the interconnect wires routed on a stator are positioned adjacent one another, a large voltage differential between the adjacent interconnect wires can produce phase-on-phase conditions in the motor and can cause premature failure of the insulation on the wires. In a compressor motor, any large voltage differential between adjacent wires can be magnified because the motor is used as a magnetization fixture where upwards of 1600 Volts and 1200 Amps may be passed through the stator at a given instant. In addition, a compressor motor can be used with a Pulse Width Modulated (PWM) drive. The waveform from the PWM drive may have high voltage spikes on the leading and trailing edges of the waveform, creating the need to separate the phase wires. Traditionally, motors use insulation made of MYLAR® or NOMEX® between the magnetic wires forming the separate winding coils. It is also known in the art to use secondary insulation between the interconnect wires interconnecting the winding coils. Unfortunately, such secondary insulation can increase the manufacturing costs and production time of the motor.

Some segmented stator assemblies use interlocking features or hinges on the segments to hold them together. For example, U.S. Pat. No. 6,127,753 to Yamazaki et al. discloses segments having hinged ends that connect adjacent segments together. Unlike the segmented stators having interlocking segments, some prior art segments for stators are not formed to directly interlock with other segments of the stator. Instead, such segments have ridged and slotted ends. The ends merely fit together on adjacent segments so that the segments are not physically held together in the absence of some other retaining structure. Hence, the stator segments are used to form a stator of the "loose" segmented type. "Loose" segmented stators typically require a secondary retention device, such as a heavy metal band, to hold the segments together when the segments are formed into the annular shape of the stator. The heavy band is positioned around the outside diameter of the segments to hold them together when manufacturing the motor or when transporting the stator as a separate part to customers. In addition, conventional segmented stators do not provide a ready way to axially align the segments to prevent unacceptable differences in tolerances during manufacture. Currently, no form of axial alignment for "loose" segmented stators is thought to exist in the art.

As noted above, segmented stators can be used in hermetic motors for a compressor of a refrigeration system. The compressor has an oil pump on the bottom of the compressor, which is known as the oil sump. Typically, oil is pumped up through a shaft of the hermetic motor, past the stator and rotor, and to the main bearing of the compressor. From the bearing, the oil is let loose on a lead end of the motor to drain back to the oil sump. The contours of the motor, such as the contours of the segmented stator, can determine how the oil is allowed to return to the oil sump from the lead end of the motor. In addition, oil from the oil sump in the hermetic motor can also pool in cavities and recesses of typical end caps, which can prevent the return of oil to the oil sump. If the motor does not have sufficient drain area, for example, the oil will become dammed on the lead-end of the motor. The damming of oil can cause higher oil circulation in the refrigeration system, can starve the oil pump of oil, and can hinder the performance of the compressor. On the other hand, if the motor has too much drain area for the return of the oil, then the stator may have less back iron than desired. A stator with less back iron can have higher magnetic flux saturation and reduced performance.

Typical stators for hermetic motors in compressors have flat areas defined on the outside diameter of the stator. The flat areas of the stator provide a drain area for the oil to pass from the lead-end of the motor to the oil sump. In some stators, the flat areas are made very large so that the material used to form the stator can be used efficiently. However, the large size of these flat areas in the stator can deform the shell of the motor. For example, the progression of the laminations forming the stator with the flat areas can create issues with shell deformation. In addition, the scroll shear pattern when used in a compressor can create issues with shell deformation because of the physical size of the flat areas on the outside of the stator. Thus, a trade off is typically made between the size of the flat areas in the stator and the efficient use of material used to make the stator.

The subject matter of the present disclosure is directed to overcoming, or at least reducing the effects of, one or more of the problems set forth above.

SUMMARY OF THE PRESENT DISCLOSURE

A stator for an electromagnetic machine includes a plurality of discrete and individually wound stator segments having end caps positioned on the segments. In one aspect, the end caps have legs for positioning the end cap on the segments with an interference fit. In another aspect, the end caps have angled surfaces to facilitate winding of wire on the segments. In another aspect, the end caps have male and female couplings that mate together to couple adjacent segments together. In yet another aspect, the end caps have fingers and slots for aligning the segments on substantially the same plane. In a further aspect, the end caps have wire isolation features, including hooks, shelves and ledges, for separating the interconnect wires routed on the stator to electrically interconnect the segments. In another aspect, the segments include scalloped contours on their outer edges for draining oil, and the end caps have passages for draining oil.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which:

FIGS. 3A through 3B illustrate a plan view and a perspective view of a laminated segment for the disclosed segmented stator assembly.

FIG. 4 illustrates a detailed plan view of a portion of the disclosed segmented stator assembly.

FIGS. 5A through 5D illustrate various views of an embodiment of a lead end cap on a segment of the disclosed stator assembly.

Figure 1:
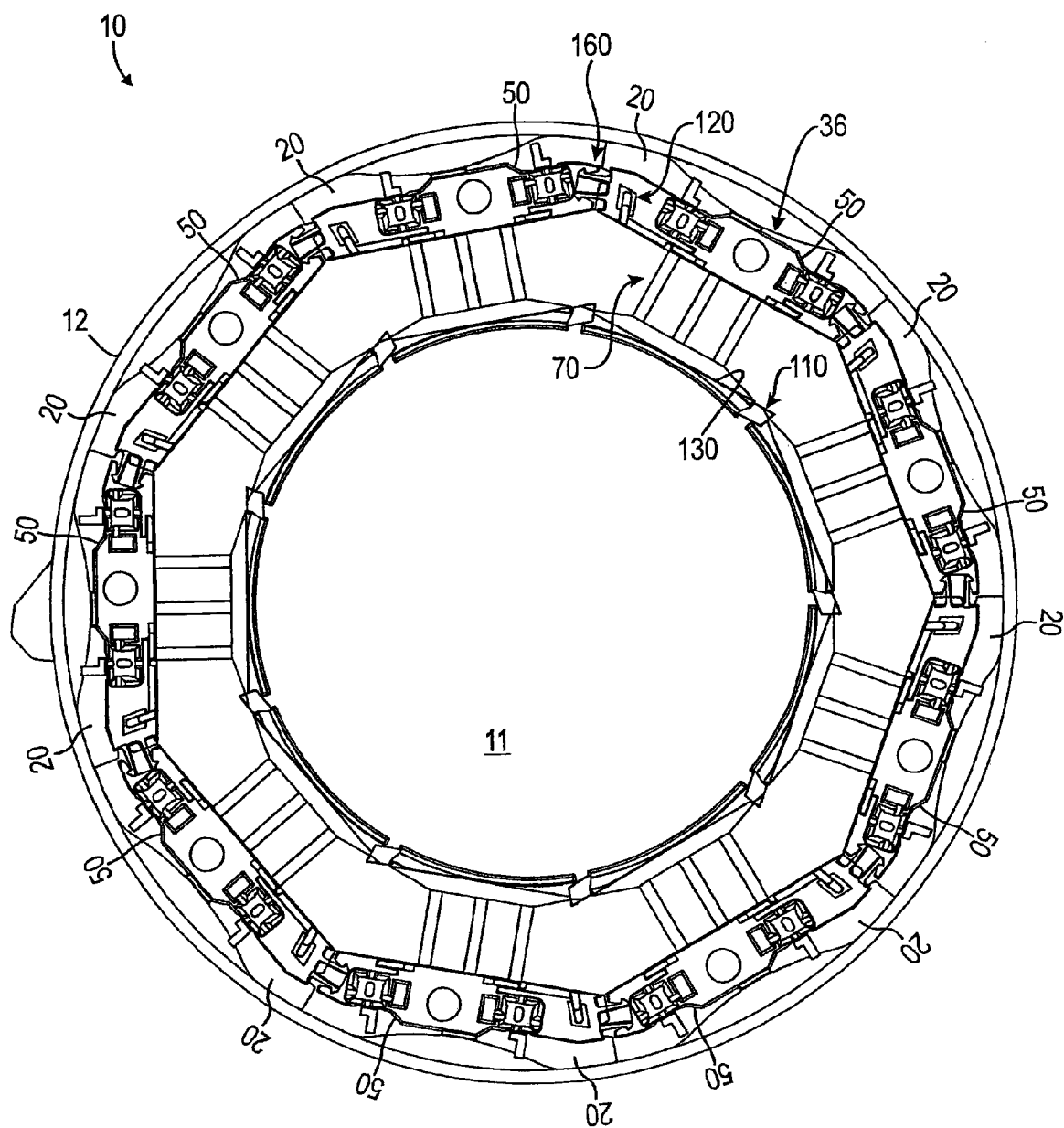
FIG. 1 illustrates a plan view of an embodiment of a segmented stator assembly according to certain teachings of the present disclosure positioned in a shell.

While the disclosed end caps, segments, stator, and associated methods are susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. § 112.

DETAILED DESCRIPTION

A. Stator Assembly

Figure 2A:
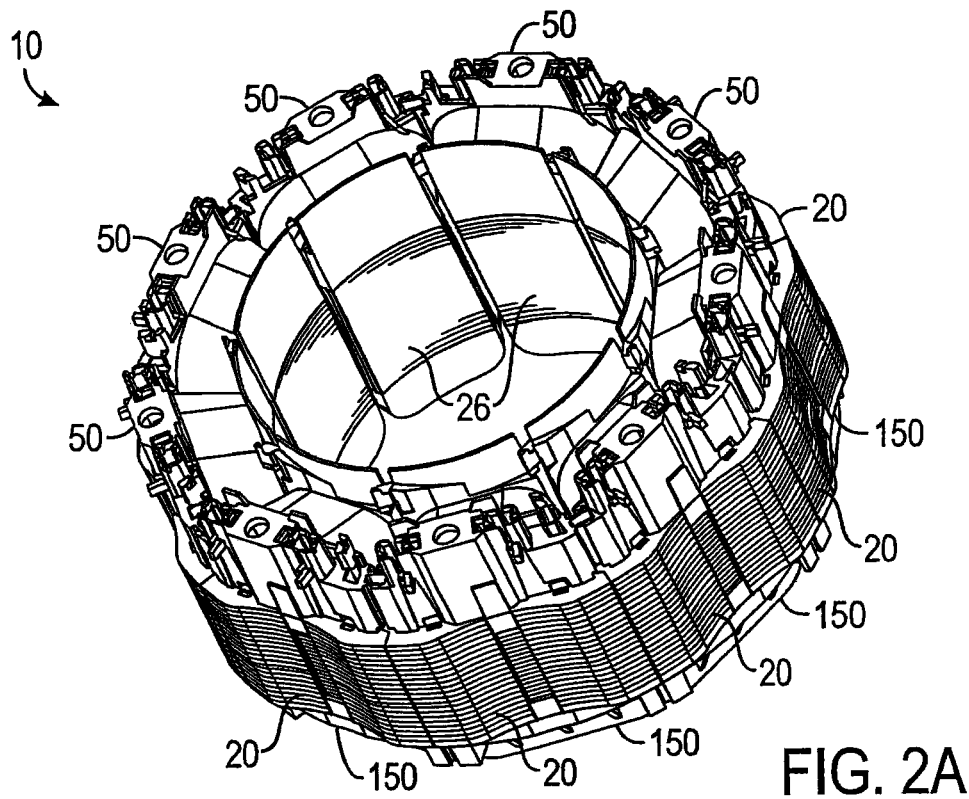
FIGS. 2A through 2B illustrate top and bottom perspective views of the disclosed segmented stator assembly.
Figure 2B:
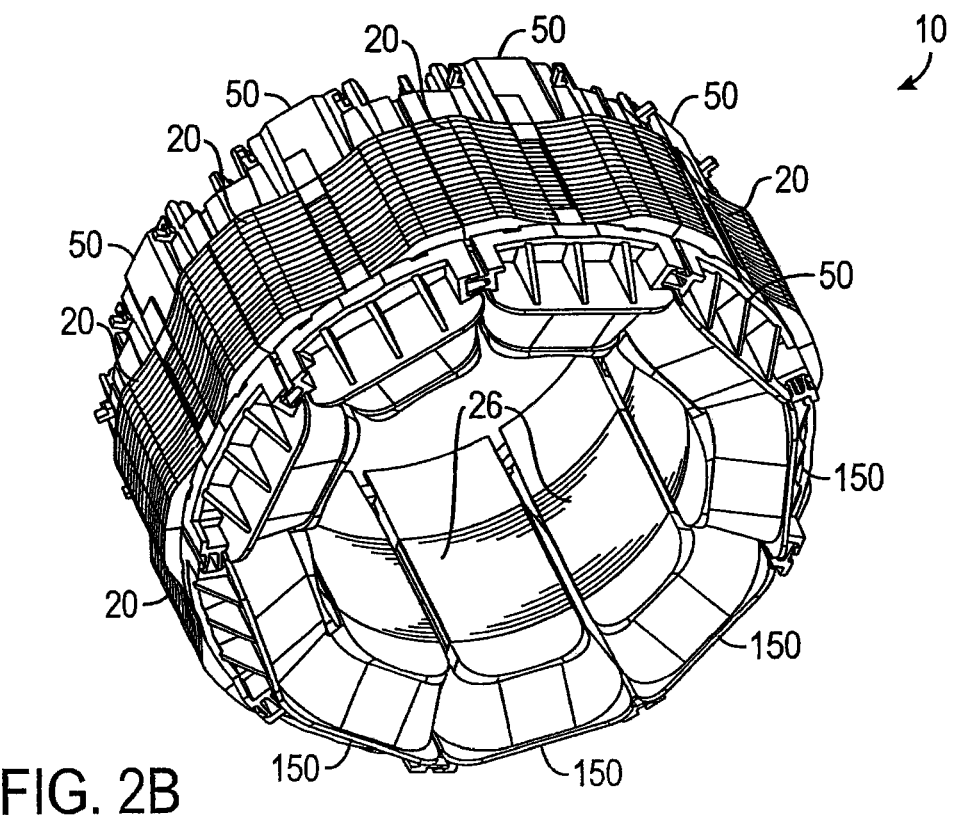

Referring to FIGS. 1 and 2A-2B, an embodiment of a segmented stator assembly 10 according to certain teachings of the present disclosure is illustrated. FIG. 1 illustrates a plan view of the disclosed stator assembly from the lead-end, and FIGS. 2A and 2B illustrate perspective views of the disclosed stator assembly 10 from the lead-end and the base-end, respectively. The disclosed stator assembly 10 is of the "loose" segmented stator type. The disclosed stator assembly 10 can be used in variable speed motor applications, such as a hermetic compressor for a refrigeration system of a vehicle or a residence, for example. However, certain teachings of the present disclosure can be used with other types of stator and used in other motor applications.

The segmented stator assembly 10 includes a plurality of discrete stator segments 20. The segments 20 have lead end caps 50 and base end caps 150. In the present example, the segmented stator assembly 10 has nine segments 20 that are individually wound with wire to form winding coils 92, although alternate embodiments with a different number of segments and end caps are envisioned and possible. The segmented stator assembly 10 is typically contained within a motor shell (not shown), and a rotor and shaft (not shown) are positioned for rotation within a bore 11 of the stator 10.

B. Segments

Referring to FIGS. 3A-3B, a laminated segment 20 for the disclosed stator assembly 10 is shown in a plan view and a perspective view, respectively. The construction of each segment 20 is generally similar to the construction of segments used in conventional segmented stators. For example, each segment 20 is formed from a plurality of substantially identical laminations 21. The laminations 21 are made of stamped steel and stacked together to form the segment 20.

Each segment 20 includes a yoke portion 22 and a tooth portion 24. The yoke portion 22 has an outboard edge 30 that defines a rear channel 38. The rear channel 38 receives a portion of the end caps 50 and 150 in a press-fit relationship to help couple the end caps 50 and 150 to the stator segments 20, which is described in more detail below. In the present embodiment, each segment 20 includes a slotted end 32 and a ridged end 34 defined in the yoke portion 22. The slotted and ridged ends 32 and 34 of adjacent segments 20 interfit with one another when the segments 20 are formed into the annular shape of the stator 10, as best shown in FIGS. 1 and 2A-2B. In particular, the slotted ends 32 receive the ridged ends 34 when adjacent stator segments 20 are brought together. The adjacent ends 32 and 34 inhibit relative movement of the adjacent stator segments 20 in at least one direction. Unlike prior art stator assemblies having interlocking hinges or puzzle pieces that serve to directly connect adjacent stator pieces together, the slotted and ridged ends 32 and 34 of the present embodiment do not physically hold together adjacent stator segments 20 in the absence of some other retaining structure. Hence, the stator segments 20 in the present embodiment form a stator of the "loose" segmented type.

In the present embodiment, the tooth portion 24 of the segment 20 has a pole end 26, which is generally "T" shaped. The inboard face of the pole end 26 (i.e., the surface of the pole end 26 facing away from the yoke portion 22) forms the bore of the assembled stator within which the rotor is positioned for rotation. As is known in the art, wire (not shown) is wound about the tooth portion 24 of the stator segments 20 to form a winding coil. The outboard face of the pole end 26 (i.e., the surface of the pole end 26 facing the yoke portion 22) at least partially helps to position and retain the winding coil in a desired position on the tooth portion 24, as described in more detail below.

C. Lead End Caps

As noted above, each of the discrete stator segments 20 of the assembled segmented stator 10 as shown in FIGS. 1 and 2A-2B has a lead end cap 50 and a base end cap 150. Referring to FIGS. 5A-5D, a discrete stator segment 20 having end caps 50, 150 is shown in a number of isolated views to reveal relevant details of the lead end cap 50 for the disclosed stator assembly. The lead end cap 50 is used on the lead-end of the stator segment 20 (i.e., the end of the stator segment 20 positioned toward the main bearing or "top" of the motor). The lead end cap 50 is composed of non-conductive material and is preferably composed of RYNITE® FR530 by Dupont.

The lead end cap 50, which is also shown in various isolated views in FIGS. 6A-6F, includes a body portion 60, a winding portion 74, and an inboard wall 76. The lead end cap 50 fits on the stator segment 20 so that a substantially flat surface 52 of the end cap 50 positions adjacent the lead-end of the segment 20. In particular, the body portion 60 positions onto the yoke portion 22 of the segment 20, the winding portion 74 positions on to the tooth portion 24 of the segment 20, and the inboard wall 76 positions of the pole end 26 of the segment 20. As best shown in the side views of FIGS. 6D and 6F, both the body portion 60 and inboard wall 76 of the lead end cap 50 extend well beyond the winding portion 74 and form a winding pocket 70, and both the body portion 60 and inboard wall 76 have substantially the same height above the tooth portion. As schematically shown in FIGS. 5A-5D, wire of the winding coil 92 is wound within the winding pocket 70 about the tooth portion 24 so that a portion of the winding coil 92 is partially positioned between the body portion 60 and the inboard wall 76 and is partially positioned on the winding portion 74 of the end cap 50.

Figure 6A:
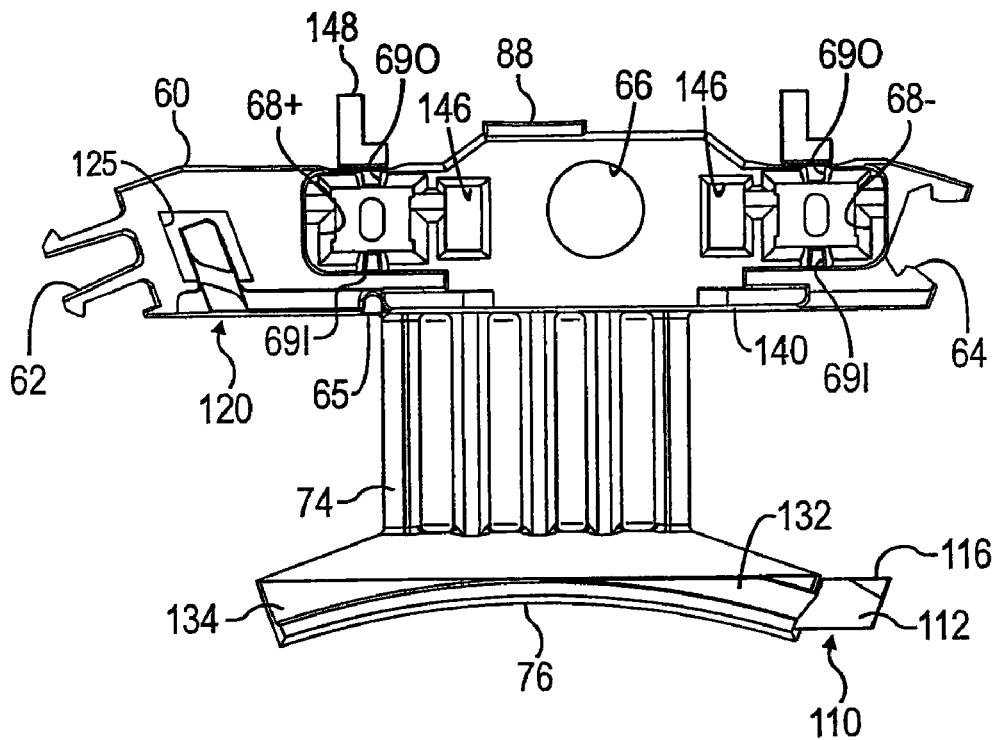
FIGS. 6A through 6F illustrate various isolated views of the lead end cap for the disclosed stator assembly.

As best shown in FIG. 6A, the winding portion 74 of the lead end cap 50 defines a plurality of ribs, which are partly necessary for molding the end cap 50. Preferably, the winding portion 74 defines five ribs for providing sufficient strength to the end cap 50. The ribs may be formed in the winding pocket 70 where wire is intended to be wound, as shown in FIG. 6A. In an alternative embodiment, the bottom surface 52 (shown in FIG. 6B) may instead define the plurality of ribs. Forming the ribs in the bottom surface 52 may be beneficial in strengthening the end cap 50 because the ribs will be under compression when positioned against the surface of a segment. In addition, the connection of the winding portion 74 with the inboard wall 76 on the top surface of the winding portion 74 may be a high stress point. By forming the ribs in the bottom surface 52 of the winding portion 74, the potentially "high stress" connection of the winding portion 74 to the inboard wall 76 will be uniform, which can reduce the chances of breakage between the winding portion 74 with the inboard wall 76.

1. Retaining Features

As best shown in FIGS. 5A-5D, the lead end cap 50 positions on the stator segment 20 with a plurality of legs. In the present embodiment, the lead end cap 50 includes two tooth legs 82 and a body leg 88. The tooth legs 82 are attached to the inboard wall 76, the body leg 88 is attached to the edge of the body portion 60, and the legs 82 and 88 extend from the flat surface 52 of the end cap 50 for fitting on the segment 20. When the end cap 50 is positioned on the segment 20, the tooth legs 82 fit on either side of the tooth portion 24, and the body leg 88 fits in the channel 38 formed on the outboard edge 30 of the segment 20. The edges of the tooth legs 82 fit on either side of the tooth portion 24 an interference fit, and an outboard surface of the tooth legs 82 position against the inboard face of the pole end 26.

The three legs 82 and 88 substantially hold the end cap 50 on the segment 20 and sufficiently align the end cap 50 on the segment 20. With the end cap 50 substantially stabilized on the segment 20 by the legs 82 and 88, the end cap 50 is prevented from moving during winding procedures or other manufacturing steps. For example, the legs 82 and 88 minimize any axial and tangential movement of the end cap 50 and eliminate the need to glue the end cap 20 to the segment 20. Conventionally, end caps known in the art are glued on the segment to keep the end cap from moving side to side or into the bore during manufacture. On the disclosed end cap 50, however, the tooth legs 82 and the body leg substantially hold the end caps 50 in place on the segment 20 without the need for glue.

2. Undercut Areas

Because the legs 82 and 88 of the lead end cap 50 have edges that form an interference fit with the segment 20, the edges pass against edges of the stator segment 20 as the end cap 50 is positioned on the segment 20. Consequently, the edges of the segment 20 can scrape material of the plastic legs 82 and 88 as the end cap 50 is positioned on the segment 20 and can force skived material against the flat surface 52 of the end cap 50. Any skived material collected between the surface 52 and the segment 20 can prevent the end cap 50 from fitting properly flat against the lead-end of the segment 20. Accordingly, the disclosed end cap 50, as best shown in the bottom view of FIG. 6B, defines under-cut channels 54 on the flat surface 52 adjacent the tooth legs 82 and adjacent the body leg 88. These under-cut channels 54 collect any skived material from the legs 82 and 88 when the end cap 50 is fit onto the segment so that the flat surface 52 of the end cap 50 can fit snugly against the lead-end of the segment.

Figure 6B:
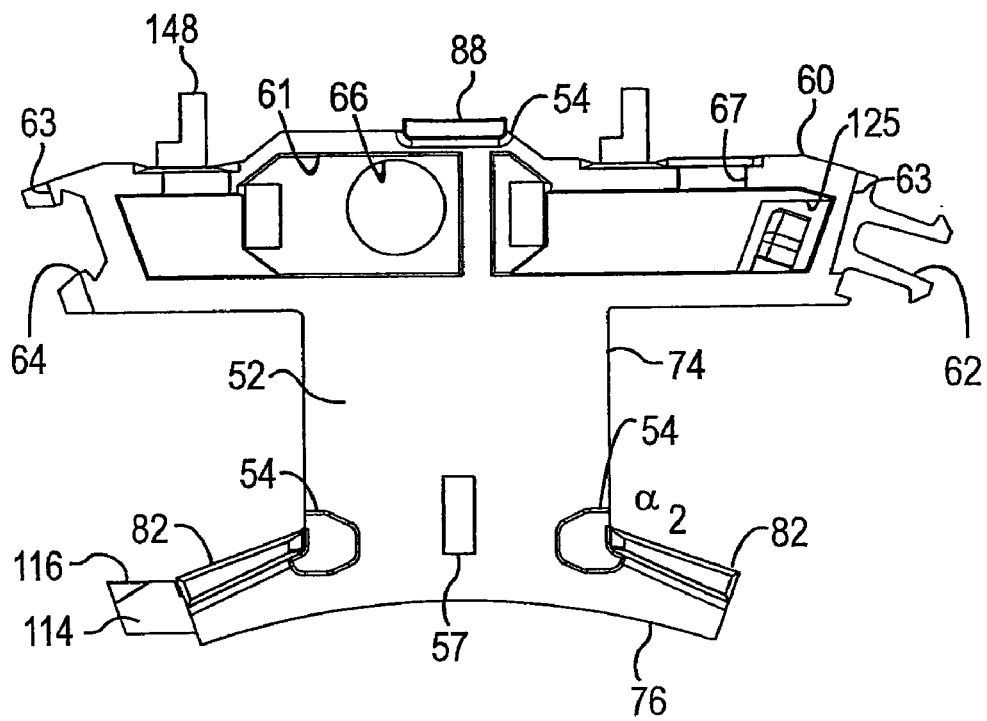
Figure 6C:
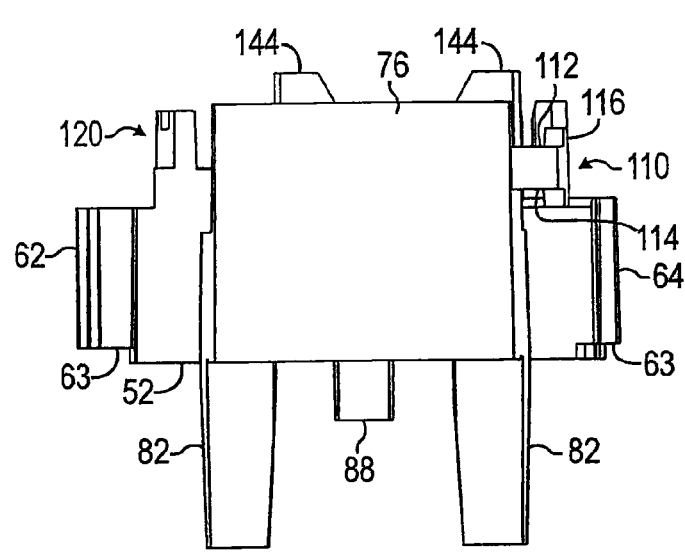

As also shown in the bottom view of FIG. 6B, the flat surface 52 of the lead end cap 50 defines a divot 57 to accommodate an interlock tab (element 37 shown in FIG. 3A) that is conventionally used for stacking laminations of the segment. Furthermore, the outboard edge of the body portion 60 defines passages 67 that also accommodate the other interlock tabs (elements 37 shown in FIG. 3A) on the segment. As best shown in FIG. 6B, the passages 67 on the lead end cap 50 communicate a hollow 61 of the body portion 60 with the outboard edge of the end cap 50 so that the passages 67 also serve as drain holes, as described in more detail below.

3. Pocket Features

In the present embodiment and as best shown in the detailed view of FIG. 4, the lead end caps 50 each preferably include first and second pockets 68+ and 68− for insulation displacement connectors (IDCs) (not shown). The IDC pockets 68+ and 68− each have an inboard slit 69-I and an outboard slit 69-O. A leading portion 93L of the wire used to form the winding coil 92 fits in one of the IDC pockets 68+, and the trailing end 93T of the wire 90 of the winding coil 92 fits in the other IDC pocket 68−. In an exemplary interconnect scheme described in more detail below, a phase interconnect wire 94A used to interconnect the winding coils between segments 20 of the same phase also fits into the one IDC pocket 68+ on the end cap 50. In the exemplary interconnect scheme, a neutral or common interconnect wire 96 used to interconnect the common ends of the winding coils 92 of the stator fit into the other IDC pocket 68−. Thus, the slits 69-I, 69-O pass the wires 90, 94, 96 through the IDC pockets 68+, 68− between the inboard and the outboard sides of the stator assembly 10.

The outboard slits 69-O position the wire in a defined relationship to the outboard side of the stator assembly 10 and to any exterior shell (not shown) into which the stator assembly 10 may be positioned. As best shown in the top view FIG. 6A, posts 148 extend from the body portion 60 adjacent the outboard slits 69-O. These posts 148 are used during winding procedures and are eventually removed during later assembly.

The inboard slit 69-I of the IDC pockets 68+, 68− are specifically positioned to ensure that the wire 90 that forms the winding coil 92 is positioned in a defined relationship to the tooth portion 24 of the segment 20. In particular and as best shown in FIG. 6A, the inboard slit 69-I of the IDC pockets 68+ is substantially aligned with the edge of the winding portion (not shown) that fits adjacent the tooth portion 24 of the segment 20. A groove 65 is preferably formed in the body portion 60 of the end cap 50 from the slit 69-O to the edge of the winding portion 74. As best shown in FIG. 4, the groove 65 is used to guide and hide the leading portion 93L for the winding coil 92 to the tooth portion of the segment. On the other hand and as best shown in FIG. 6A, the inboard slit 69-I of the other IDC pockets 68− is positioned further from the edge of the winding portion 74. As best shown in FIG. 4, the inboard slit 69-I of the other IDC pockets 68− receives the trailing portion 93T of the winding coil 92.

In addition to the slits 69-I, 69-O, the lead end cap 50 includes a connection reference walls 140 on an inboard side of the body portion 60, as best shown in FIG. 4. The connection reference wall 140 is positioned away from IDC pockets 68+, 68− and is used to align wire with the slits 69-I, 69-O when positioning the wire on the stator 10 during manufacture. Edges 142 of the wall 140 are substantially aligned with the inboard slits 69-I and are used to bend wire relative to the inboard slits 69-I. The connection reference wall 140 also has tips or portions 144 that extend beyond the body portion 60. The tips 144 create a reference point for aligning the wire in the slits 69-I, 69-O of the IDC pockets 68+, 68−. For example, the tips 144 of the wall 140 extends far enough beyond the body portion 60 to allow a winding probe or nozzle to bend the wire above the IDC pocket 68+, 68− before the wire is put into the slits 69-I, 69-O. Having the extending tips 144 of the wall 140 eliminates the need to have a hook extending above the body portion 60, which could interfere with an automated winding process.

As best shown in FIG. 4, the lead end cap 50 also has alignment slots 146 adjacent each of the IDC pockets 68+, 68−. The alignment slots 146 facilitate automated assembly of the stator 10 by providing a reference point for aligning automated devices that embed IDCs (not shown) in the IDC pockets 68+, 68−. For example, the present embodiment preferably uses insulation displacement connectors (IDCs) manufactured by Tyco. The IDCs fit into the pockets 68+, 68−. Preferably, the IDC pockets 68+, 68− have upward posts within the pockets to facilitate positioning of the IDCs. Once installed, the IDCs electrically connect the winding coil wires (e.g., 92) and the interconnect wires (e.g., 94A and 96) passing through the pocket 68+, 68−. In addition, the IDCs provide a terminal for a wire lead to connect to the motor. The end cap 50 also includes a mounting hole 66 in which a cable tie for holding the wire lead can be snapped.

D. Base End Caps

Figure 9A:
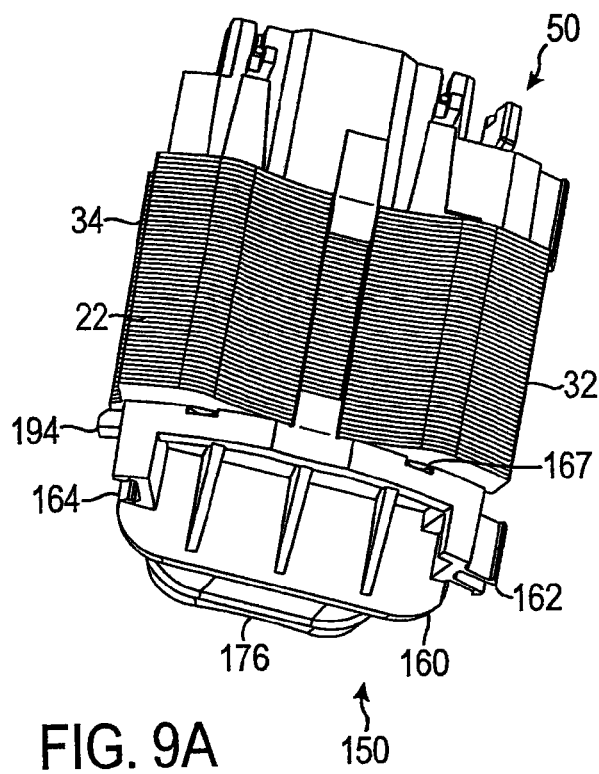
FIGS. 9A through 9C illustrate various views of an embodiment of a base end cap on a segment of the disclosed stator assembly.
Figure 9B:
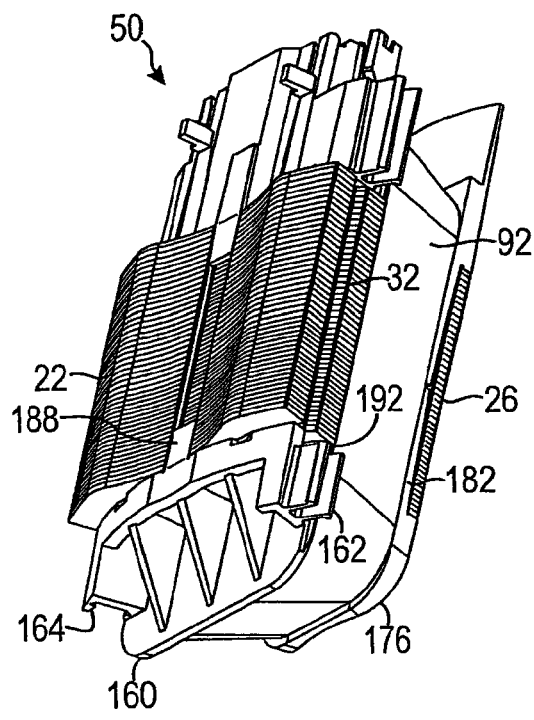
Figure 9C:
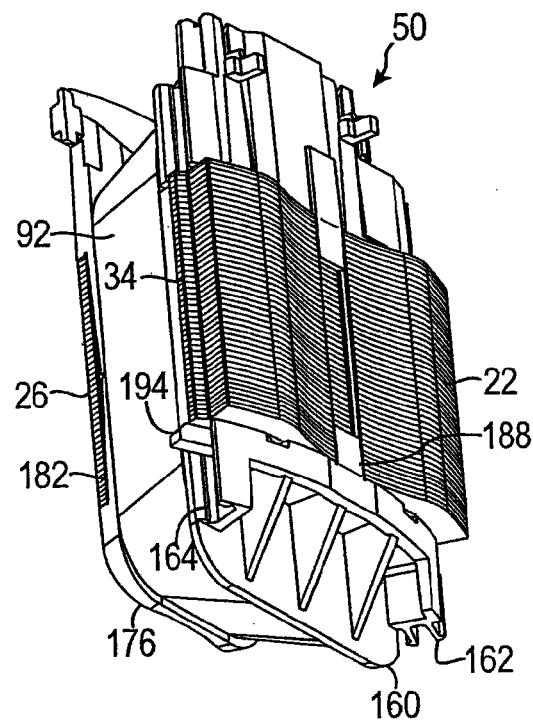

As noted above, the discrete segments 20 of the stator 10 have base end caps 150. Referring to FIGS. 9A through 9C, a stator segment 20 having end caps 50, 150 is shown in a number of isolated views to reveal relevant details of the base end caps 150 for the disclosed stator assembly. The base end cap 150 is used on the base end of the stator segment 20 (i.e., the end of the stator segment positioned toward the oil sump or "bottom" of the motor). The base end cap 150 is substantially similar to the lead end cap discussed above. For example, the base end cap 150, which is shown in a number of isolated views in FIGS. 10A through 10F, includes a body portion 160, a winding portion 174, an inboard wall 176, and a substantially flat surface 152.

The base end cap 150 fits on the base-end of the stator segment 20 in a similar fashion to the fitting of the lead end cap on the lead-end. For example, the base end cap 150 has two tooth legs 182 attached to the inboard wall 176 and extending from the flat surface 152. The disclosed end cap 150 also has a body leg 188 attached to the body portion 160 and extending from the bottom surface 152. When positioned on the segment 20, the tooth legs 182 of the base end cap 150 fit one either side of the tooth portion and against the pole end 26 with an interference fit, and the body leg 188 fits in the channel 38 formed on the outboard edge 30 of the segment 20. The legs 182 and 188 securely hold the base end cap 150 on the segment 20, thus not allowing the end cap 150 to move during winding procedures or other manufacturing steps.

Figure 10A:
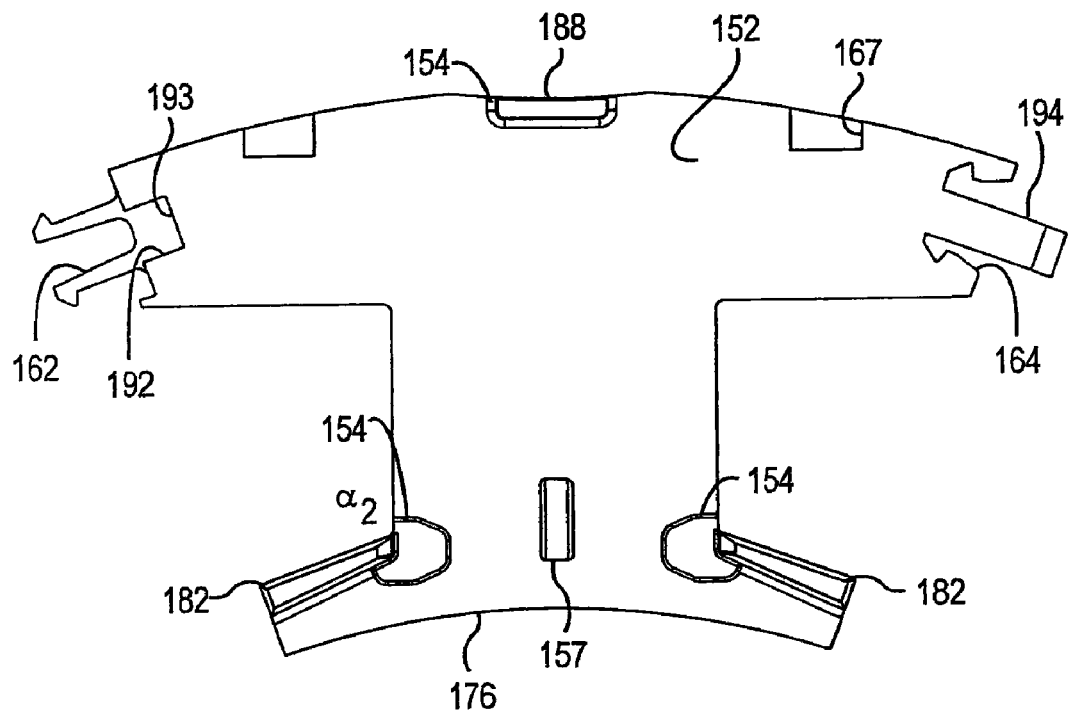
FIGS. 10A through 10F illustrate various isolated views of the base end cap for the disclosed stator assembly.
Figure 10B:
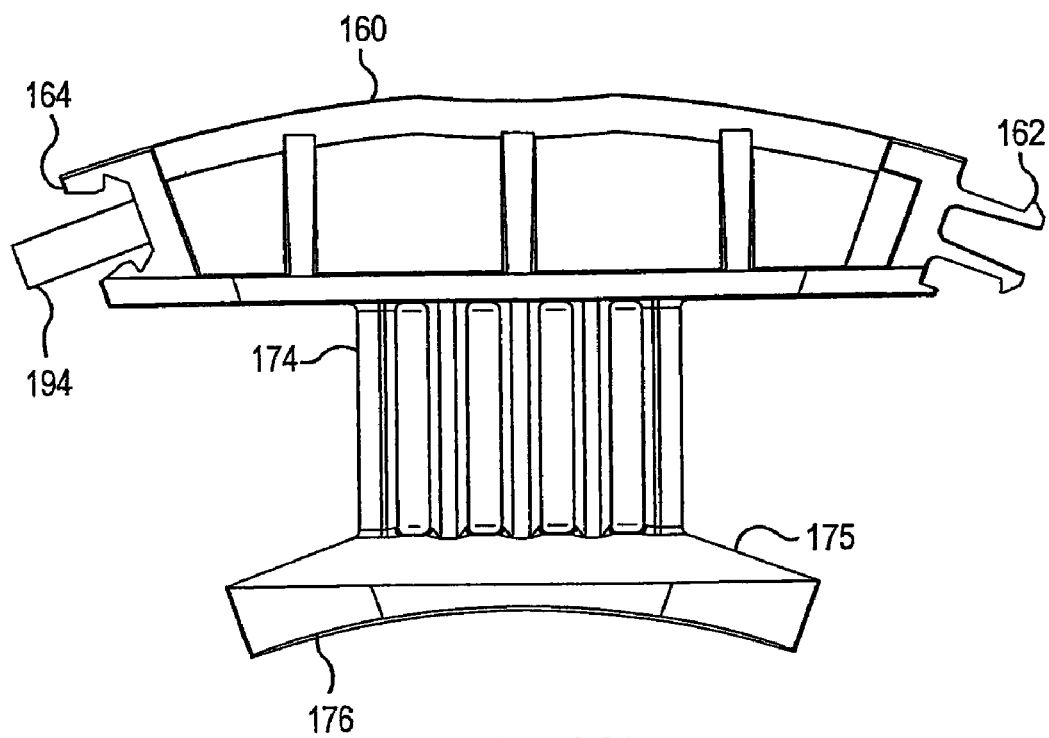

Similar to the lead end cap discussed above, the base end cap 150, as best shown in the top view of FIG. 10A, includes under-cut channels 154 on the flat surface 152 adjacent the legs 182 and 188 for collecting skived material from the legs 182 and 188 when the base end cap 150 is positioned onto a segment. Furthermore, the flat surface 152 of the base end cap 150 defines a divot 157, and the edge of the body portion 60 defines nooks 167 to accommodate the interlock tabs (elements 37 in FIG. 3A) conventionally used for stacking laminations of a segment.

E. Winding Procedure

During assembly of the disclosed stator 10, the segments 20 are formed from a plurality of stacked laminations in a process known in the art, such as shown in FIGS. 3A and 3B, for example. Then, the lead and base end caps 50 and 150 are positioned on the discrete segment 20. Next, strips of MYLAR® or other such material (not shown) are attached to the sides of the tooth portions 24 of the segments 20, as known in the art. The strips typically have an adhesive backing for attachment and provide protection and insulation for wire to be wound on the tooth portion 24. Then, a winding coil 92, which is schematically shown in FIGS. 5C and 5D, for example, is formed on the segment 20. The windings coils 92 are formed by techniques known in the art, such as fly or needle winding. Preferably, the present embodiment uses a winding technique having a spindle and bobbin where a winding coil 92 is individually wound about each discrete stator segment 20.

In the present embodiment, one of benefits of the "loose" segmented stator is that the discrete stator segments 20 can be freely handled and can be individually rotated to wind with wire to form the winding coil. Thus, access to the slot area of the discrete stator segments 20 enhances precision in the winding procedure and offers denser slot fills. In addition, the access to the discrete segment 20 allows the segments 20 to be wound at high speeds.

Briefly, the spindle/bobbin winding technique begins by placing the segment 20 having the attached insulation strips and end caps 50, 150 in an arbor machine that latches onto the ends 32 and 34 of the segment 20. A leading portion of wire is bent about the projecting post 148 on the outboard side of the lead end cap 50 to position the wire in a fixed location on the end cap 50. The wire is then inserted into the slits 69 of the IDC pocket 68+. The arbor machine rotates the segment 20, and a movable wire nozzle feeds wire to the segment 20. While the segment 20 is rotated, the wire is wound about the tooth portion 24 of the segment 20 and the winding portions 74, 174 of the end caps 50, 150 to form the winding coil 92.

At completion of the coil 92, the wire is then run out towards the outboard side of the end cap 50 through the slits 69 of the neutral IDC pocket 68– on the lead end cap 50 where the wire is then trimmed. Preferably, the wire is bent at an angle from the outboard slit 69-O to prevent the wire from coming out of the pocket 68– after trimming. As those of skilled in the art will appreciate, winding a coil about a tooth portion 24 of a segment 20 in a given direction achieves an electromagnet of a polarity when the winding is energized in that given direction. Such a winding process is repeated individually on the various segments 20 for the stator.

As schematically shown in FIGS. 5C and 5D, wire of the winding coil 92 is wound so that portions of the winding coil 92 are also partially positioned between the body portions 60, 160 and the inboard walls 76, 176 of the end caps 50, 150. The wire of the winding coil 92 is also wound so that portions of the coil 92 are partially positioned between the legs 82, 182 and the yoke portion 22 of the segment 20. The distal ends of opposing legs 82 and 182 on the lead and base end caps 50 and 150 preferably substantially meet one another so as to not allow metal of the pole end 26 to be substantially exposed, as best shown in FIGS. 5C and 5D. Thus, the legs 82 and 182 add substantial insulation for the winding coil 92 from the metal that forms the pole end 26 of the segments 20.

Figure 6D:
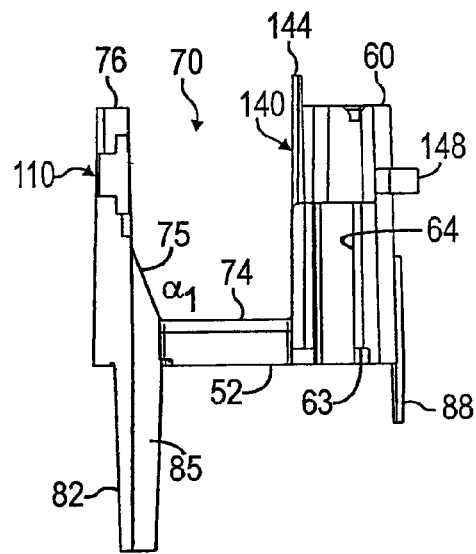
Figure 6E:
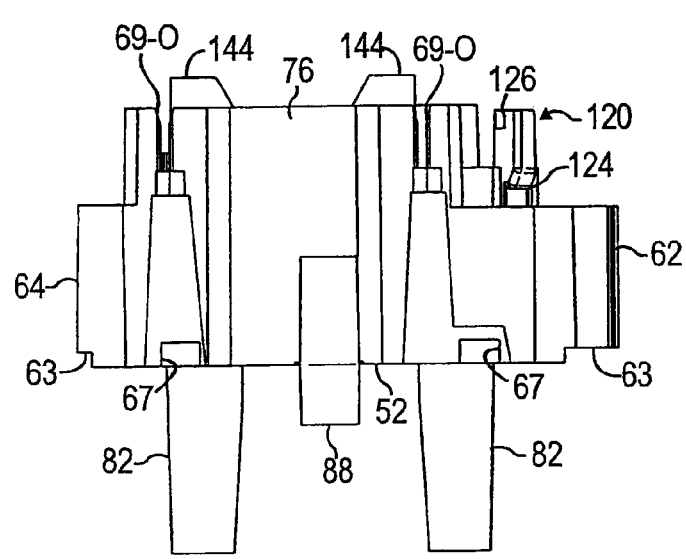
Figure 6F:
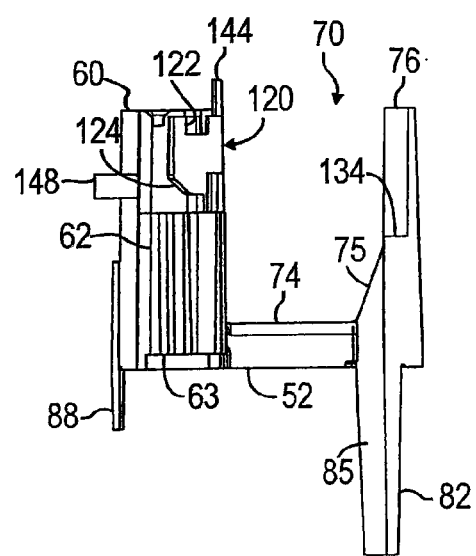

To facilitate winding of the wire during the winding procedure, the lead end cap 50, as best shown in the side views of FIGS. 6D and 6F, has a winding pocket 70 that gives a substantially constant slot dimension about the end cap 50 and tooth portion (not shown) of a segment when positioned thereon. The body portion 60 on the lead end cap 50 has an inboard side that is substantially perpendicular to the winding portion 74 that fits onto the tooth portion of the segment. The inboard wall 76 has an outboard side that is substantially perpendicular to the winding portion 74 and that opposes the inboard side of the body portion 60.

An angled surface 75 of the end cap 50 angles from the winding portion 74 to the inboard side of the outboard wall 76. The angled surface 75 is configured to position wire of the winding coil (not shown) in the slot area between the body portion 60 and inboard wall 76. Furthermore, the tooth legs 82 each have an angled surface 85 on an outboard side of the legs 82. The angled surface 85 angles from a side of the tooth portion (not shown) of the segment. This angled surface 85 is similarly configured to position wire of the winding coil in the slot area between the pole end 26 and the yoke portion 22 of the segments, as shown in FIGS. 5C and 5D, for example.

The wire pocket 70 of the end cap 50 is contoured to have substantially the same cross-sectional slot area in both the axial and circumferential directions. As shown in FIG. 6D, the angled surface 75 near the inboard wall 76 defines an angle $\alpha_1$. As shown in FIG. 6B, the angled surfaces 85 on the legs 82 defines an angle $\alpha_2$. The angle $\alpha_1$ is preferably substantially equivalent to the angle $\alpha_2$. In addition, these angled surfaces 75 and 85 preferably transition smoothly where they meet with one another so that the transition between the angled surfaces also define the same angle as angles $\alpha_1$ and $\alpha_2$ relative to the tooth portion of the segment. In one embodiment, the angles $\alpha_1$ and $\alpha_2$ are about 110-degrees.

As shown in FIGS. 3A and 3B, for example, the sides of the tooth portion 24 are preferably substantially perpendicular to the lead-end and base-end of the segment 20. As noted above, the bottom surface 52 of the lead end cap 50 is positioned parallel against the lead-end of the segment, and the edges of the winding portion 72 are aligned with the edges of the tooth portion of the segment. Because the wire pocket 70 of the end cap 50 is contoured to have substantially the same cross-sectional slot area in both the axial and circumferential directions. Thus, the wire is given a substantially constant slot dimension as the segment 20 is rotated during a winding procedure. As a result, the wind of the winding coil on the segment can be performed faster, tighter, and more consistently. In addition, the wire forming the winding coil can comfortably fall into place in the wire pocket 70 as the wire is layered during the winding procedure and can reduce or eliminate "wire collapse" and cross over of the wire in the coil during the winding procedure, which achieves a denser winding coil.

Figure 10C:
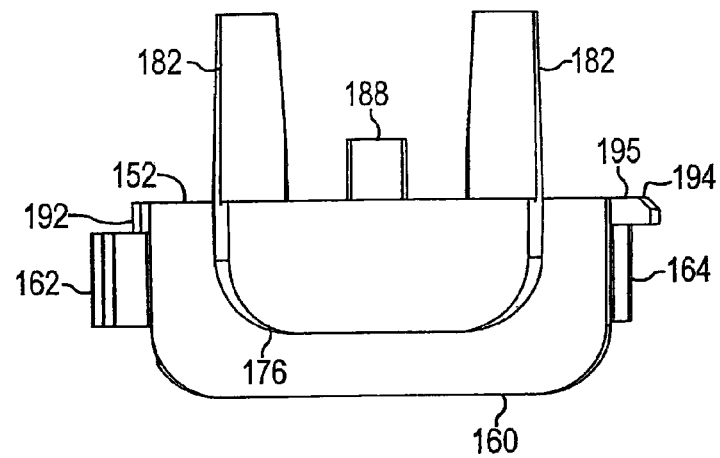
Figure 10D:
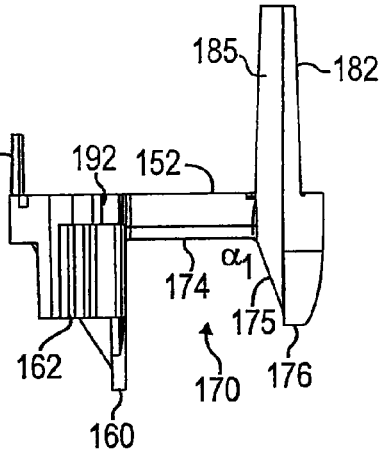
Figure 10E:
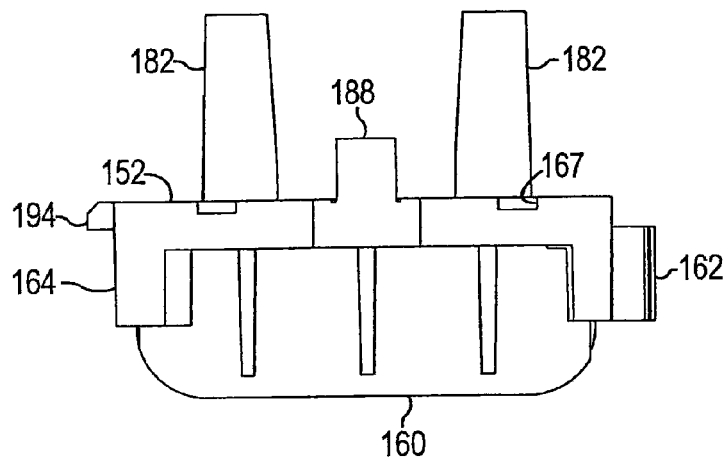
Figure 10F:
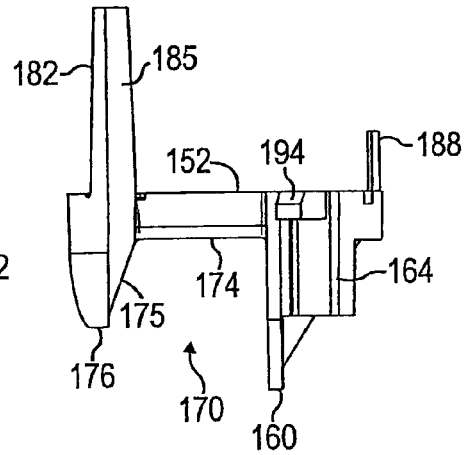

To facilitate winding of the wire during the winding procedure, the base end cap 150, as best shown in the side views of FIGS. 10D and 10F, also has a winding pocket 170 that gives a substantially constant slot dimension about the end cap 150 and tooth portion (not shown) of the segment when positioned thereon. The winding pocket 170 is substantially similar to that disclosed above for the lead end cap. For example, the body portion 160 on the base end cap 150 has an inboard side that is substantially perpendicular to the winding portion 174 that fits onto the tooth portion of the segment. The inboard wall 176 has an outboard side that is substantially perpendicular to the winding portion 174 and that opposes the inboard side of the body portion 160. An angled surface 175 of the end cap 150 angles from the winding portion 174 to the inboard side of the outboard wall 176 to position wire of the winding coil. Furthermore, the tooth legs 182 each have an angled surface 185 on an outboard side of the legs 182 to position wire of the winding coil. As with the lead end cap described above, the angled surfaces 175 and 185 are similarly configured to position wire, and each surface 175 and 185 defines a substantially equivalent angle with respect to the tooth portion.

F. Mechanical Assembly of Stator

After the segments 20 are individually wound according to certain teachings of the present disclosure detailed herein, the individually wound segments 20 are assembled into a generally annular configuration to form the stator. As noted in the Background Section of the present disclosure, some segmented stator assemblies use interlocking features or hinges on the segments to hold them together. In another type of segmented stator assembly, co-pending U.S. patent application Ser. No. 10/427,450, entitled "Segmented Stator With Improved Handling And Winding Characteristics And Method Of Winding The Same" and filed Apr. 30, 2003, which is incorporated herein by reference in its entirety, discloses a segmented stator assembly that uses flexible containment structures on the segments to hold them together. In contrast, the stator segments 20 of the present embodiment preferably have the ridged and slotted ends 32 and 34 that are positioned into physical contact with one another to form a closed magnetic circuit, and no direct, segment-to-segment attachment exists between the stator segments 20.

1. Coupling between End Caps

As noted in the Background Section of the present disclosure, typical "loose" segmented stators (e.g., those stators with segments that do not interlock together by a hinge) need a heavy band that is typically made of metal to be placed around the outside of the segments to hold the segments together, especially during the manufacturing process. In the present embodiment, however, respective ends 62/64 and 162/164 of the disclosed end caps 50 and 150 couple together to interconnect or substantially hold the individually wound stator segments 20 together. The respective ends 62/64 and 162/164 of the disclosed end caps 50 and 150 can be coupled together by hand or by automation. On the lead end cap 50 best shown in FIGS. 5A-5D, one end 62 of the end cap body portion 60 preferably includes a male coupling 62, and another end 64 preferably includes a female coupling 64. The male and female coupling 62 and 64 are preferably features incorporated into the body portion 60 of the end cap 50. The male coupling 62 preferably extends from the end of the body portion 60 adjacent a slotted end 32 of the yoke portion 22 of the segment 20. In addition, the female coupling 64 is preferably defined in the end of the body portion 60 positioning adjacent the ridged end 32 of the yoke portion 22.

These male and female couplings 62 and 64 mate together between adjacent end caps 50 to substantially hold the segments 20 together, as best shown in FIG. 4, for example. In the present embodiment, the male and female couplings 62 and 64 are snap features. The male coupling 62 includes deformable, bifurcate catches, and the female coupling 64 includes a grooved slot. When the pressed into the female coupling 64, teeth on the ends of the bifurcate catches 62 engage inside the grooves of the female coupling 64. The male and female couplings 62 and 64 eliminate the need for a heavy metal band or any other special fixture to independently hold the segments together during manufacturing or during transportation of the assembled stator.

Figure 7A:
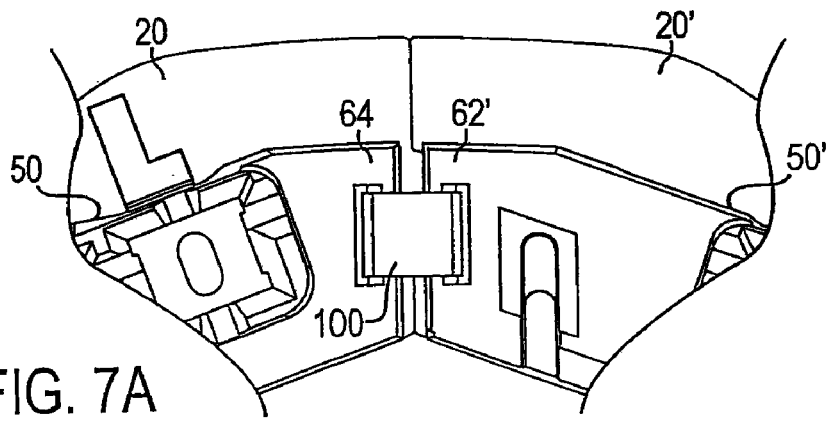
FIGS. 7A through 7C illustrate an alternative embodiment for coupling ends of adjacent lead end caps together.
Figure 7B:
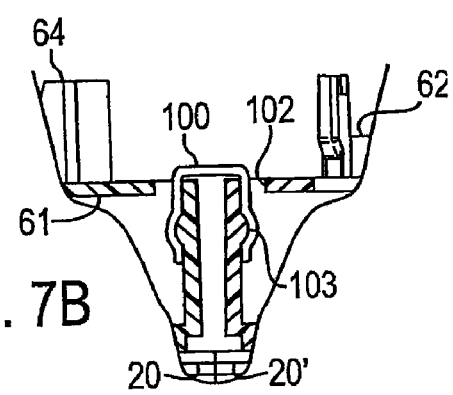
Figure 7C:
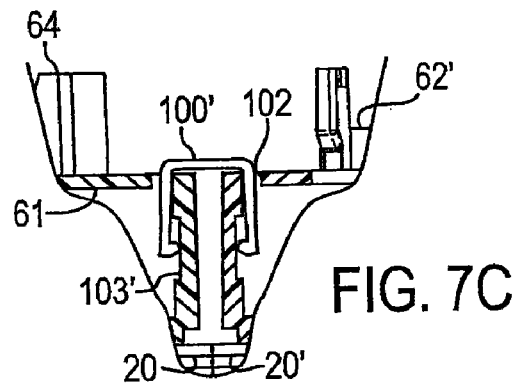

In alternative embodiment illustrated in FIGS. 7A and 7B, ends 62' and 64 of adjacent end caps 50, 50' can couple together using a separate C-clamp 100. The ends 62', 64 of the adjacent end caps 50, 50' can each define a pocket 102. The separate C-clamp 100, which can be stainless steel, for example, can fit within the pockets 102 of the adjacent end caps 50, 50' to couple them together. The pockets 102 can each include a retaining rib 103 formed on the inner wall of the cavity 61 of the end caps 50, 50'. The retaining ribs 103 can engage the C-clamp 100 and can hold it in place. In contrast to the retaining ribs 103 and as shown in FIG. 7B, the pockets 102 can each include a retaining slot 103' formed on the inner wall of the cavity 61 of the end caps 50, 50'. The C-clamp 100' can have hooked ends that can fit within the retaining slots 103' to hold the clamp 100' in place. The slots 103' can be elongated along the height of the end caps 50, 50' to allow for adjustment between the adjacent end caps 50, 50' due to differences in tolerances from the laminated segments 20, 20' and end caps 50, 50'.

Figure 8A:
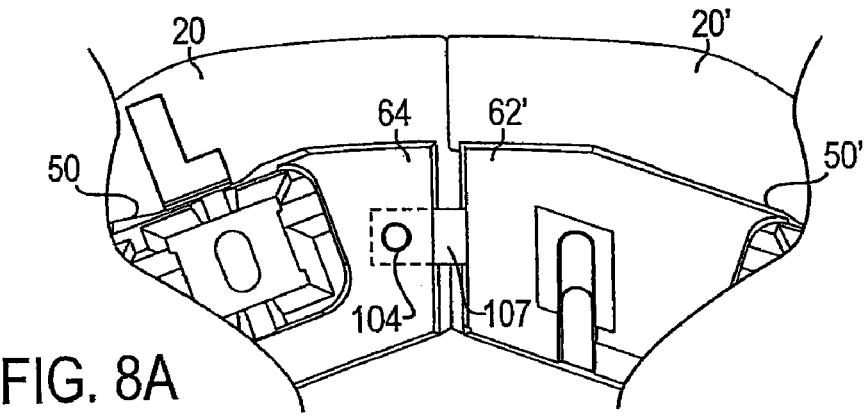
FIGS. 8A and 8B illustrate another alternative embodiment for coupling ends of adjacent lead end caps together.
Figure 8B:
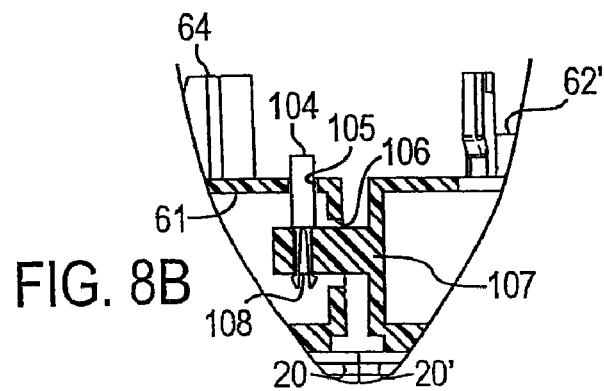

In another alternative embodiment illustrated in FIGS. 8A and 8B, ends 62', 64 of the adjacent end caps 50, 50' can couple together using a separate cotter pin 104. One end 62' of an adjacent end cap 50' can include a stem 107 that extends from the side of the end cap 50' and that has a retaining hole 108. The other end 64 of the adjacent end cap 50 can define a hole 105 in which the cotter pin 104 inserts. The stem 107 on the one end cap 50' can fit into an opening 106 in the sidewall of the adjacent end cap 50. The cotter pin 104 can then be fit through the hole 105 of the end cap 50, and the end of the cotter pin can connect into the hole 108 in the stem 107. In this way, the cotter pin 104 and stem 107 can substantially hold the adjacent end caps 50, 50' together. Moreover, the opening 106 in the sidewall through which the stem 107 inserts can be elongated along the height of the end caps 50, 50' to allow for adjustment between the adjacent end caps 50, 50'.

2. Alignment Features

As best shown in FIGS. 9A through 9C, the base end cap 150 similarly has ends 162 and 164 that mate together to hold adjacent segments 20 together. The ends 162 and 164 in the present embodiment are substantially similar to those on the lead end cap described above. In addition to the mating ends 162 and 164, the base end cap 150 has a feature for aligning adjacent segments 20. The alignment feature includes an alignment slot 192 on one end of the body portion 160 and includes an alignment finger 194 on another end.

Preferably, the finger 194 extends from the end of the body portion 160 having the female coupling 164. The finger 194 extends from the body portion 60 for inserting into the slot 192 of an adjacent base end cap 150. As best shown in FIG. 10C, the alignment finger 194 has a side 195 that is substantially on the same plane as the substantially flat surface 152 of the end cap 150. When the base end cap 150 is positioned on a segment, the side 195 of the finger 194 lies on substantially the same plane as the base-end of the segment. Preferably, the slot 192 is defined in the same side of the body portion 160 having the male coupling 162. As best shown in FIG. 10A, the alignment slot 192 is open toward the end of the end cap 150 for inserting a finger 194 of an adjacent base end cap 150. In addition, the alignment slot 192 has an open side 193 towards the flat surface 152 of the base end cap 150. When the base end cap 150 is positioned on a segment, the open side 193 of the slot 192 exposes the base-end of the segment.

Figure 11:
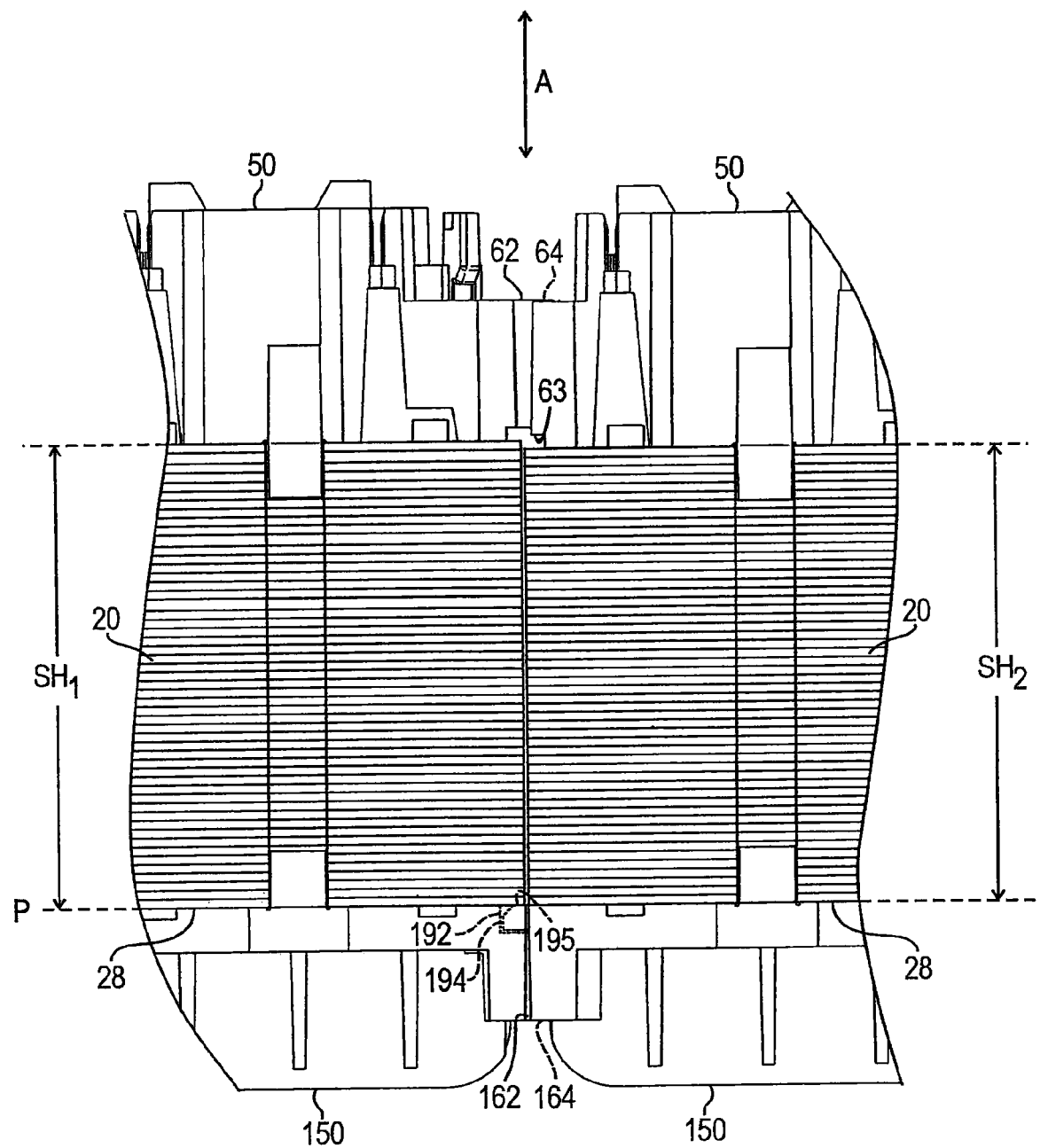
FIG. 11 illustrates the disclosed lead and base end caps on adjacent segments having different stack heights.

Referring to FIG. 11, lead and base end caps 50 and 150 are shown coupled together on adjacent segments 20 of an assembled stator. The end caps 50, 150 on the various segments 20 of the stator may have different tolerance values. In addition, the stack heights of the various segments 20 can vary as much as plus or minus two (2) lamination thicknesses per stack, which can be caused by variations in the plurality of laminations used to form the segments 20. Differences in tolerances and stack heights can create unevenness in the axial direction A (e.g., the direction generally parallel to a central axis of the assembled stator) when the various segments 20 are put together to assemble the stator. For illustrative purposes, the adjacent segments 20 in FIG. 11 are shown with different stack heights $SH_1$ and $SH_2$.

The disclosed end caps 50 and 150 have features to overcome differences in tolerances and stack heights. When the base end caps 150 of the adjacent segments 20 are brought together, the finger 194 on one end cap 150 fits within the slot 192 on the adjacent end cap 150. The end of the finger 194 is preferably chamfered as shown because the finger 194 inserts into the slot 192. When positioned in the slot 192, the side 195 of the finger 194 positions against the substantially flat, base surface 28 of the adjacent segment 20 exposed by the open side (not labeled) of the slot 192. As a result, the substantially flat, base surfaces 28 of the adjacent segments 20 lie substantially on the same plane P.

In addition, the male and female couplings 62,64 and 162, 164 can adjust relative to one another in the axial direction A when the end caps 50 and 150 are mated together. In particular and as best shown in FIGS. 5A-5D or 9A-9C, the male and female couplings 62,64 and 162,164 are formed substantially along the height of the end caps 50 and 150, and the female couplings 64 and 164 are open ended in the axial direction. Thus, the male and female couplings 62,64 and 162,164 can adjust relative to one another in the axial direction once mated together to accommodate for differences in tolerances and stack heights between the various segments 20 and end caps 50, 150 of the stator when assembled.

Furthermore, the male and female couplings 62 and 64 on the lead end caps 50 preferably do not extend to the substantially flat surface on the bottom of the lead end cap 50, as shown in FIG. 11 and also in FIGS. 6B-6F. In this way, undercuts, generally indicated as 63, are formed beneath the couplings 62 and 64. With the adjacent segments 20 and lead end caps 50 coupled together as shown in FIG. 11, these undercuts 63 provide space for any differences in tolerances or stack height between the adjacent segments 20. Thus, if one segment 20 has a greater stack height $SH_1$ than the stack height $SH_2$ of the adjacent segment 20, the coupling 62 or 64 on the adjacent end cap 50 will not contact the top of the greater stacked segment 20. Instead, the undercut 63 will accommodate any excess stack height on the greater stacked segment 20.

These features of the disclosed end caps 50 and 150 can reduce the effects of certain problems associated with a segmented stator. In one exemplary problem, unevenness in the segmented stator can cause problems when a shell is pressed on the stator during manufacture. The shell may hit certain segments 20 first, causing the segments 20 to possibly pull away from each other or possibly forcing the shell to be improperly pressed on the stator. The alignment slots 192 and fingers 194 on the base end caps 150 provide the assembled stator with a substantially level base for holding the stator when pushing a shell over the stator. In another exemplary problem associated with a segmented stator, tolerance values of the various components of the stator, motor, and compressor can accumulate during manufacture. Aligning the base end cap 150 and base surfaces 28 of the segments 20 with the alignment slots 192 and fingers 194 provides a reference point for tolerances. In this way, the manufacturer can better accommodate or control the stacking of tolerance values when building the stator, motor, and compressor.

Furthermore, aligning the base end cap 150 and base surfaces 28 of the segments 20 can reduce unevenness in the segmented stator that can cause problems when the motor is stitched with interconnect wire, as described below. As alluded to in the Background Section of the present disclosure, any unevenness of the segmented stator 10 can cause problems when the stator 10 is stitched. An automated stitching device may place a force on each individual laminated segment 20 as the stator is positioned to perform the interconnections between the segments 20. If one of the segments 20 were "up" from the lower supporting datum (e.g., the base surface of the one segment 20 is above the general plane P of the other segments 20), the force of the stitch operation could cause the segment 20 to move and can possibly create a mis-stitch or scrap part. Having the segments 20 lie substantially on one plane P as discussed in FIG. 11 and supporting the stator 10 from that plane P or a plane parallel thereto during the stitching operation can substantially avoid any of these manufacturing issues. For this reason, the consistent datum between each of the individual segments 20 provided by the alignment slots and fingers 192 and 194 can be beneficial.

G. Wire Isolation

As noted above in the Background Section of the present disclosure, all three types of Induction, BPM, or SR motors can have phase-on-phase issues where adjacent wires of opposing electrical phases produce a large voltage differential between the adjacent wires. Such phase-on-phase issues can be aggravated when the motor is used as a magnetization fixture having large voltages and amps passed through the stator at one given instant. In addition, a drive (not shown) operates to control energization of the winding coils of the stator 10. In one embodiment, a Pulse Width Modulated (PWM) drive can be used with the disclosed stator assembly 10. However, other conventional techniques for controlling the energization of the winding coils can be used. As noted above, phase-on-phase issues can be aggravated when a PWM drive is used to drive the motor, because the waveform from the PWM drive may have high voltage spikes on the leading and trailing edges of the wave form, creating a need to separate the phases.

In the present embodiment, conventional insulation is preferably used between adjacent winding coils 92. As noted previously, however, prior art solutions not only use insulation between adjacent winding coils but also use additional insulation, such as MYLAR® or NOMEX® sheets and tubes, between adjacent interconnect wires to potentially reduce effects of phase-on-phase issues. Unfortunately, the additional insulation increases the cost and time of manufacturing the motor. As also noted previously, prior art solutions may simply route wire on the outside of the stator to interconnect the winding coils of the various phases. In addition, prior art solutions may merely use posts on the end caps to bend wire or may use rings with various hooks to route wire between the coils. Such prior art solutions allow wires of different phases to pass next to each other or even touch, which can produce undesirable phase-on-phase issues.

1. Routing Features on Lead End Caps

In the present embodiment, the lead end cap 50 includes a plurality of wire isolation features for routing and separating the interconnect wires. In contrast to the prior art, the wire isolation features are intended to substantially eliminate or reduce such phase-on-phase issues between adjacent interconnect wires without the use of additional insulation by keeping the interconnect wires of any given phase from touching another wire of a different phase or from positioning substantially close to another wire of a different phase. In one example, the wire isolation features create a minimum of 0.030-inch (one wire diameter) air clearance between adjacent interconnect wires. In addition, the wire isolation features on the disclosed end caps 50 are designed for automated stitching. In the present embodiment of the lead end cap 50, as shown in FIGS. 5A-6F, the wire isolation features include an inboard router or hook 110, an outboard router or hook 120, and another inboard router or wall shelf 130 positioned on the disclosed end cap 50.

a. Inboard Hook

As best shown in FIG. 5B, for example, the inboard hook 110 is positioned on the inboard wall 76 of the lead end cap 50 and extends from one side edge of the inboard wall 74. The inboard hook 110 has a high ledge 112, a low ledge 114, and a catch 116. The high ledge 112 routes wire a further distance from the segment 20 of the stator, and the low ledge 114 routes wire a closer distance from the segment 20 of the stator. Thus, the high and low ledges 112, 114 on the inboard hook 110 separate interconnect wires routed from one portion of the stator to another. The catch 116 positions the interconnect wires on the ledges 112, 114 and can used to bend the interconnect wire.

b. Outboard Hook

As shown in FIG. 5C, for example, the outboard hook 120 is positioned on the body portion 60 of the lead end cap 50 adjacent one of the IDC pockets 68+. The outboard hook 120 extends beyond the body portion 60 and has a high ledge 122 and a low ledge 124. The high ledge 122 routes interconnect wire a further distance from the segment 20 of the stator, and the low ledge 124 routes interconnect wire a closer distance from the segment 20 of the stator. Thus, the high and low ledges 122, 124 on the outboard hook 120 separate interconnect wires routed from one portion of the stator to another. The high ledge 122 preferably defines a notch 126 for positioning the wire on the high ledge 122. As noted above, the end cap 50 is preferably injection molded without the need of side pulls during the molding process so that the surfaces of the end cap 50 can be formed from two dies that are pulled apart. To form the low ledge 124 that passes adjacent to the body portion 60, a window 125 (shown in FIGS. 6A and 6B) is defined in the body portion 60 adjacent the low ledges 124. The window 125 communicates with the hollow 61 of the body and allows the end cap 50 to be molded without the use of a side pull, which can reduce the time and costs associated with manufacturing.

c. Wall Shelf

As best shown in FIG. 5A, for example, the wall shelf 130 is positioned on the outboard side of the inboard wall 76. In the present embodiment, the inboard wall 76 is relatively higher than found on existing end caps and is intended to prevent interconnect wire from interfering with the rotating rotor (not shown). In addition, the high inboard wall 76 helps guide the interconnect wires so that they do not touch one another. The wall shelf 130 includes a high ledge 132 and a low ledge 134 for separating interconnect wire routed past the inboard wall 76 from one portion of the stator to another. The high ledge 132 routes interconnect wire a further distance from the segment 20 of the stator, and the low ledge 134 routes interconnect wire a closer distance from the segment 20 of the stator. The high ledge 132 is preferably positioned adjacent the inboard hook 110 on the side edge of the inboard wall 76, and the low ledge 134 is preferably positioned adjacent an opposite side end of the inboard wall 76. While winding the phases of the motor, the interconnect wires are able to rest on the wall shelf 130 on the inboard wall 76, which can prevent the interconnect wires from interfacing with the rotor while the wire is tightened.

2. Exemplary Stitching Operation

With the individually wound segments 20 fit together, the assembled stator can proceed through the manufacturing processes without the need for a shell or metal band to hold the segments 20 together. As shown in FIG. 1, a conventional plastic cable tie 12 can be positioned about the stator assembly 10 for temporary retention of the stator assembly during further manufacturing steps.

In a further manufacturing step, the various winding coils of the segments are interconnected to form a desired phase arrangement of the motor. A number of techniques for connecting the winding coils of a segment stator are known and used in the art. In the present embodiment, however, a stitching process is used to electrically connects the individual winding coils to form the desired phase pattern. The stitching process can be done manually or automatically by techniques known in the art. Preferably, the stitching process for the disclosed stator 10 is preformed by an automated stitching device for positioning interconnect wire on the stator to interconnect the winding coils. Details of an automated stitching device and stitching techniques are disclosed in co-pending U.S. patent application Ser. No. 10/193,515, filed Jul. 11, 2002 and entitled "Improved Interconnection Method for Segmented Stator Electric Machines," which is incorporated herein by reference in its entirety.

Briefly, the automated stitching device may be similar to conventional winding equipment used to wind the individual stator segments, because the mechanisms for routing the interconnect wires are substantially similar to those used for winding wire around the segments. The automated stitching device is preferably a computer numerical controlled (CNC) machine. The automated stitching device can have a wire nozzle to feed wire, a stationary or movable spindle to position the wire, and a rotating or stationary mount for supporting the stator, for example. The needle and/or the stator are moved in a programmable fashion to position interconnect wires from end cap to end cap on the stator. For example, the automated stitching device can be moved by a controller and motor arrangement, while the stator is held stationary. On the other hand, the automated stitching device can be stationary, while the stator is positioned by a controller and motor arrangement. Alternatively, both the automated stitching device and the stator can be moved by controller and motor arrangements.

To avoid phase-on-phase issues, the inboard hooks 110, outboard hooks 120, and wall shelves 130 on the lead end caps 50 are used in the automated stitching operation to connect the various phases of the motor. The automated stitching operation may use a wire nozzle, which can have a 4-mm diameter, to position interconnect wire between the various end caps 50. Because wire nozzle may require extra spacing for internal clearances as the nozzle is moved relative to components of the stator 10, the features of the lead end cap 50 preferably provide at least 4-mm clearance for passage of such a wire nozzle.

Figure 12A:
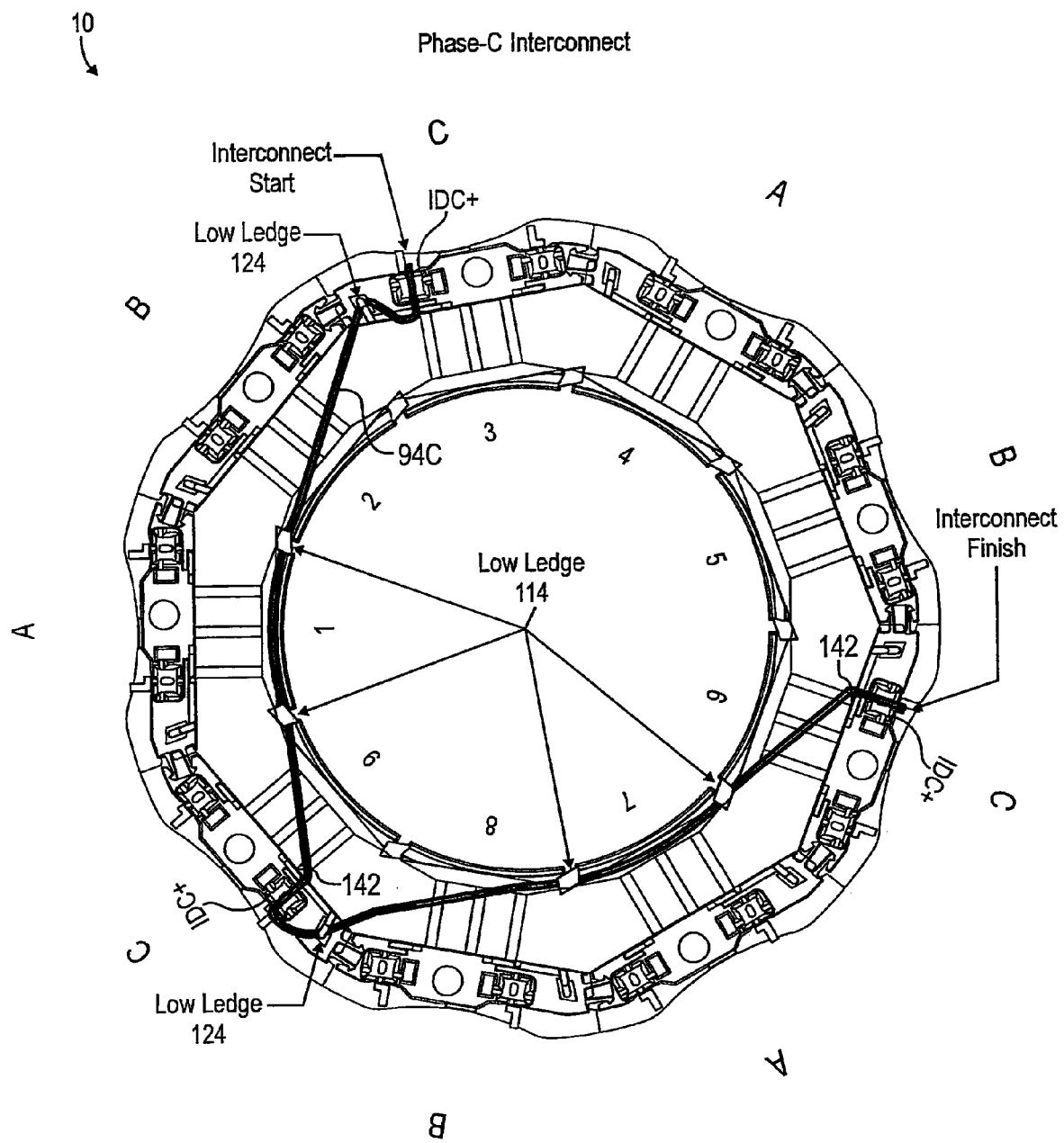
FIGS. 12A through 12D illustrates an exemplary stitching pattern for the interconnect wires on the disclosed stator assembly.

In FIGS. 12A through 12D, preferred steps of a stitching operation on the disclosed stator assembly 10 are schematically illustrated. As shown in FIG. 12A, the present example of the disclosed stator assembly 10 has nine stator segments that are numbered consecutively in a clockwise direction. Each segment 20 of the stator 10 is identified with a label identifying a phase of a winding coil on the segment 20. The winding coils are not shown in FIGS. 12A through 12D for clarity. Having nine segments 20 in the present embodiment, each phase winding A, B, C includes a winding coil wound about the tooth portion of three stator segments 20 that are alternately positioned about the stator 10. The number of segments and the number of phases in FIGS. 12A through 12D are only exemplary, and other arrangements can be used without departing from the teachings of the present disclosure.

a. Phase-C Interconnect

When the segments 20 are initially formed into the annular stator 10 as shown in FIG. 12A, the winding coils (not shown) of the phases A, B, C are not electrically connected to one another. A first stitching step to connect the winding coils for the exemplary stator assembly 10 involves connecting the phase C winding coils in a reverse direction (e.g., counterclockwise in the example). In the Figures that follow, any stitched interconnect wires between steps are not shown for clarity. In addition, any excess portion of wire used in the stitching operation that is eventually removed is also not shown for clarity. In this first stitching step, portion of the phase-C interconnect wire 94C is positioned through the pocket IDC+ on the end cap for segment S-3. As noted above, a leading portion of the winding coil 92 for S-3 is already routed through pocket IDC+ so that the phase-C interconnect wire and the wire for the winding coil can be electrically connected by an IDC (not shown) that will be positioned in the pocket IDC+ during later stages of assembly.

From the pocket IDC+ on S-3, the interconnect wire 94C is then routed in the counterclockwise direction to the low outboard ledge 124 on S-3, past the outboard wall on S-2, to low inboard ledge 114 on S-1, and to low inboard ledge 114 on S-9. At S-9 having phase C, the interconnect wire 94C is routed around the edge 142 of the connection reference wall and positioned through the slits in pocket IDC+. Next, the wire 94C is routed to low outboard ledge 124 on S-9, past the outboard wall on S-8, to low inboard ledge 114 on S-7, and to low inboard ledge 114 on S-6. At S-6 also having phase C, the wire 94C is routed around the edge 142 of the connection reference wall and positioned through the slits in pocket IDC+. Thus, the phase-C interconnect wire 94C interconnects all of the pockets IDC+ of the segments S-3, S-9, S-6 for phase C. The phase-C interconnect wire 94C is eventually trimmed on the outboard sides of the end caps 50 at the outboard slits of pockets IDC+ on S-3 and S-6, and the stitching procedure continues to the next steps.

b. Phase-B Interconnect

Figure 12B:
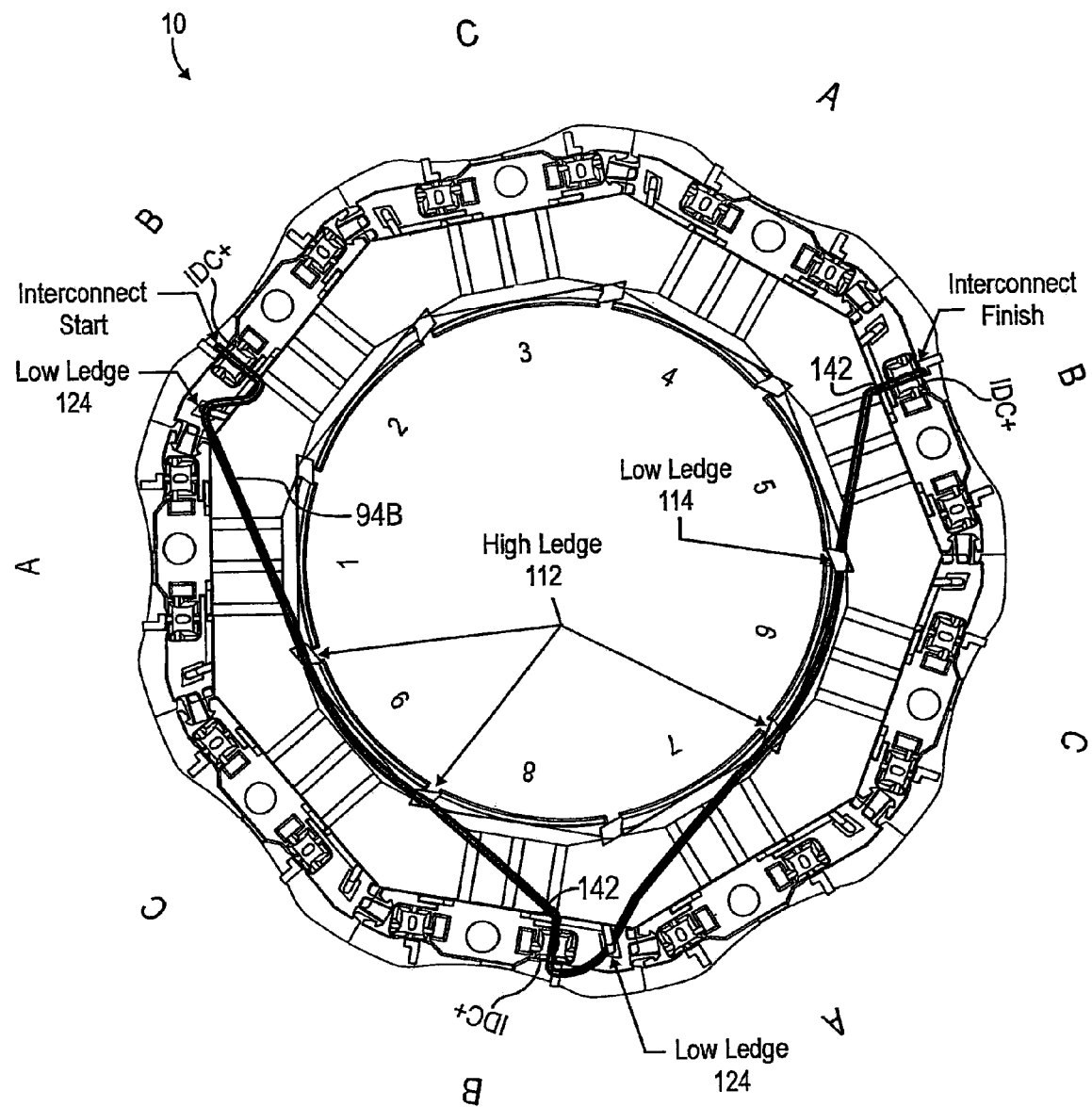

As shown in FIG. 12B, a subsequent stitching step involves connecting phase B in a reverse direction (e.g., counterclockwise in the example). In this stitching step, portion of the phase B interconnect wire 94B is positioned through pocket IDC+ on the end cap for segment S-2. The wire 94B is then routed in the counterclockwise direction to low outboard ledge 124 on S-2, past the inboard wall on S-1, to high inboard ledge 112 on S-9, and to high inboard ledge 112 on S-8. At S-8 having phase B, the wire 94B is routed around the edge 142 of connection reference wall and positioned through the slits in pocket IDC+. Next, the wire is routed to low outboard ledge 124 on S-8, past the outboard wall on S-7, to high inboard ledge 112 on S-6, and to low inboard ledge 114 on S-5. At S-5 also having phase B, the wire 94B is routed around the edge 142 of connection reference wall and positioned through pocket IDC+. Thus, the phase-B interconnect wire 94B interconnects all of the pockets IDC+ of the segments S-2, S-8, S-5 for phase B. The interconnect wire 94B is eventually terminated at the outboard slits of pockets IDC+ on S-2 and S-5.

c. Phase-A Interconnect

Figure 12C:
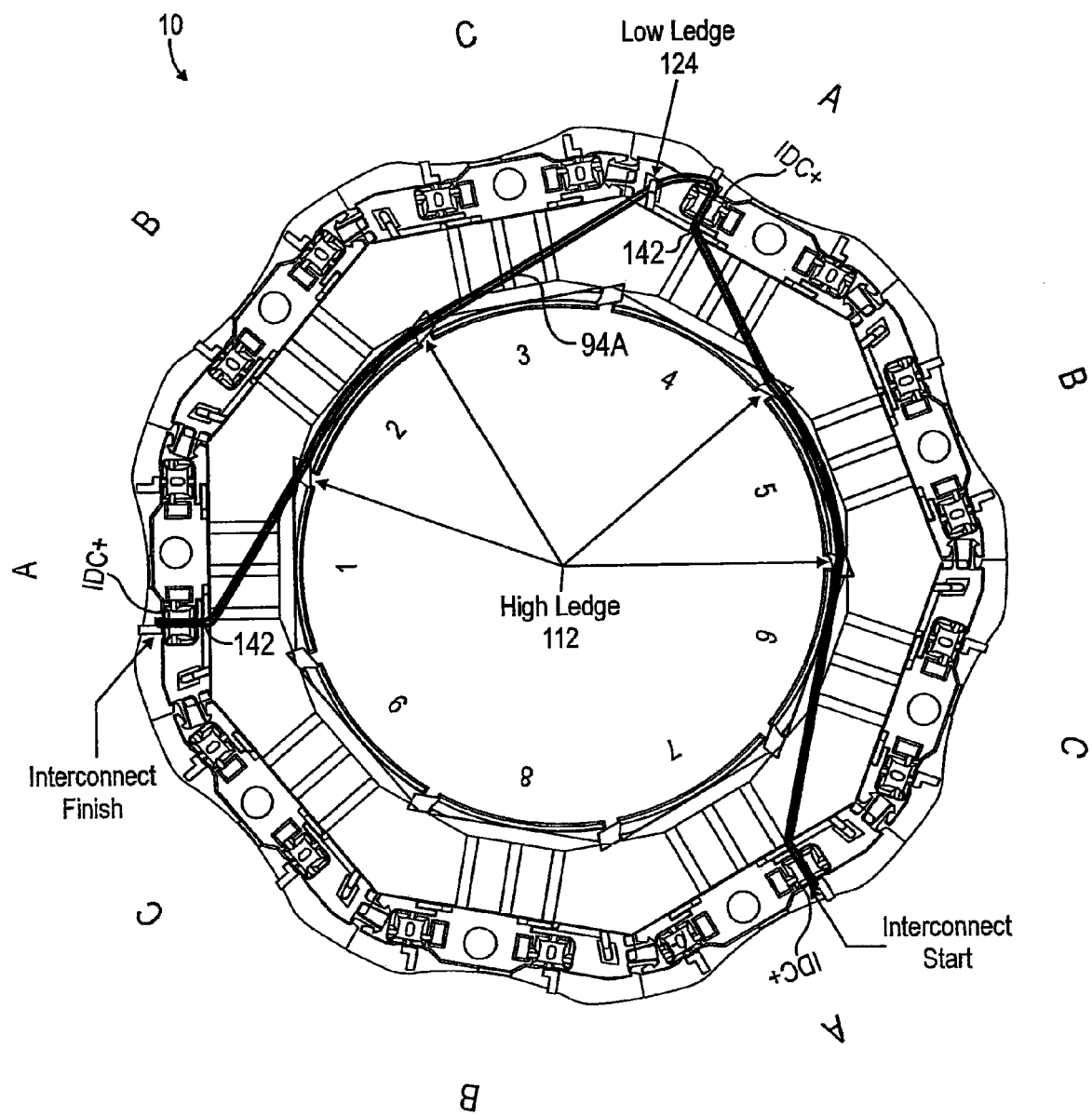

As shown in FIG. 12C, a next step of the process involves connecting phase A in a reverse direction (e.g., counterclockwise in the example). In the stitching step, portion of the phase A interconnect wire 94A is positioned through pocket IDC+ on the end cap for segment S-7. From pocket IDC+, the interconnect wire 94A is routed in the counterclockwise direction past the inboard wall on S-6, to high inboard ledge 112 on S-5, and to high inboard ledge 112 on S-4. At S-4 having phase A, the wire 94A is routed around the edge 142 of the connection reference wall and positioned through the slits in pocket IDC+. Form pocket IDC+, the wire is routed to low outboard ledge 124 on S-4, past the inboard wall on S-3, to high inboard ledge 112 on S-2, and to high inboard ledge 112 on S-1. At S-1 also having phase A, the wire 94A is routed around the edge 142 of the connection reference wall and positioned through the slits in pocket IDC+. Thus, the phase-A interconnect wire 94A interconnects all of the pockets IDC+ of the segments S-1, S-4, S-7 of phase A. The interconnect wire 94A is eventually terminated at the outboard slits of the pockets IDC+ on S-1 and S-7.

d. Common Interconnect

Figure 12D:
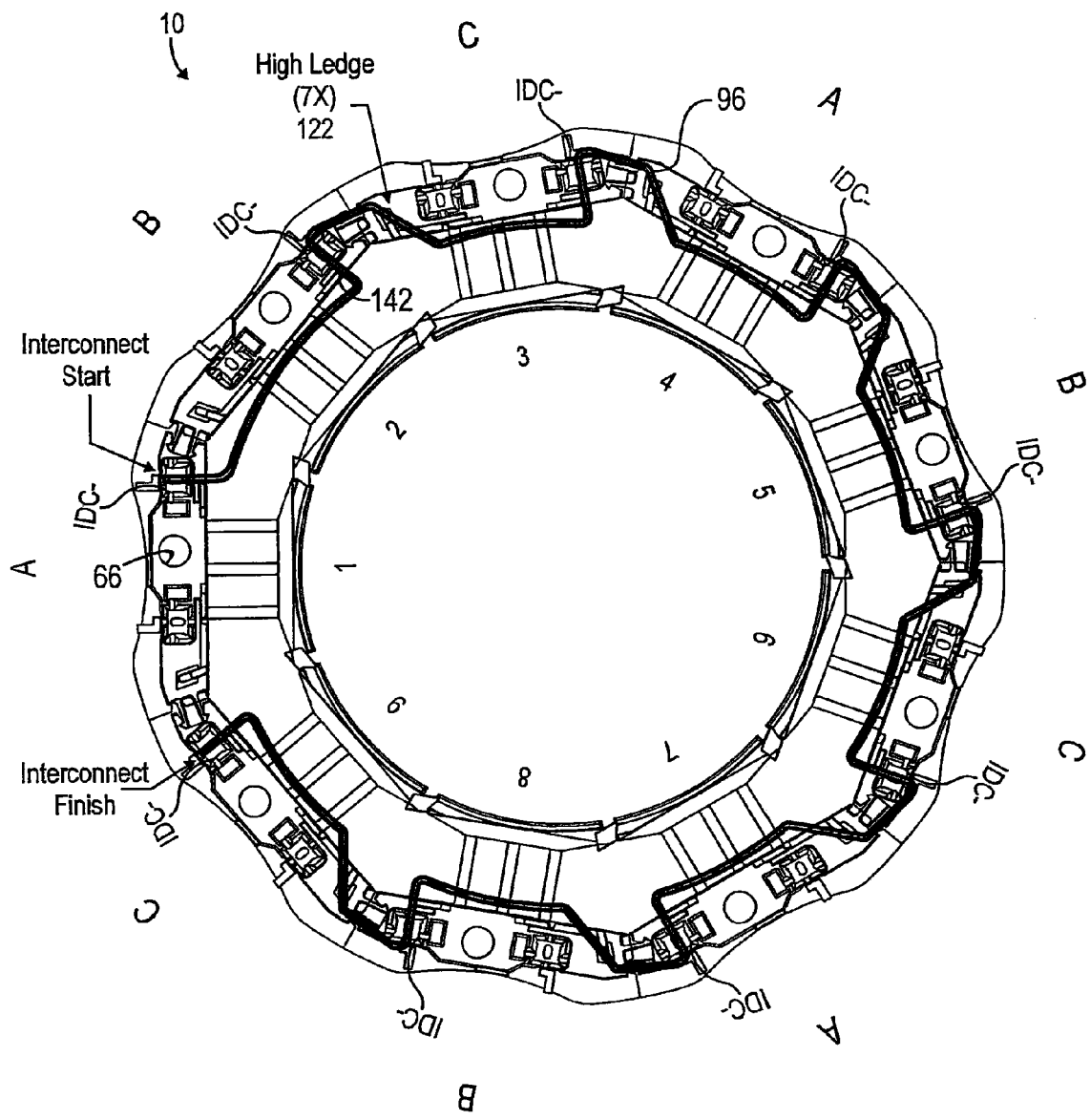

As shown in FIG. 12D, a neutral or common interconnect wire 96 is connected in a forward direction. In this stitching step, portion of the common interconnect wire 96 is positioned in the common pocket IDC− on the end cap for segment labeled S-1. As noted above, a trailing end of the wire for the winding coil of segment S-1 is also positioned through pocket IDC− so that the interconnect wire 96 and the wire of the winding coil can be electrically connected by an IDC (not shown) that will be positioned in the pocket IDC− during later stages of assembly. From the pocket IDC−, the wire 96 is then routed in the clockwise direction around the edge 142 of the connection reference wall on segment S-2, positioned in pocket IDC− on S-2, to high outboard ledge 122 on S-3. The same routing steps for the common interconnect wire 96 are then repeated on each of the segments S-3 through S-9. Thus, the common interconnect wire 96 interconnects all of the neutral pockets IDC− of the segments S-1 through S-9. The interconnect wire 96 is eventually terminated at the outboard slits of neutral pockets IDC− on segments S-1 and S-9.

In FIGS. 12A-12D, the preferred stitching patterns for the phase and common interconnect wires to connect the winding coils into the desired phase arrangement are only exemplary. Other stitching patterns can be used without departing from the teachings of the present disclosure. In one example, one or more of the above stitching patterns for the phases may be performed in an opposite direction around the stator 10. For example, another stitching pattern can involve first connecting phase C winding coils of FIG. 12A in a forward direction (e.g., clockwise), second connecting phase B winding coils of FIG. 12B in a backward direction (e.g., counterclockwise), third connecting phase A winding coils of FIG. 12C in a forward direction, and lastly connecting the neutral ends of all the winding coils of FIG. 12D in a backward direction. Furthermore, with the benefit of the present disclosure and the exemplary stitching pattern disclosed above, a person skilled in the art can develop such a pattern for a stator having more or less segments and/or more or less phases than those of the exemplary embodiment.

e. Positioning of IDCs and other Assembly Steps

After stitching the interconnect wires as described above, IDCs are positioned in the IDC pockets IDC+, IDC− and forced onto the wires positioned through the pockets IDC+, IDC−. As is known in the art, IDCs electrically connect the plurality of wires positioned in the IDC pocket and provide a terminal coupling for connecting to a terminal end of the wire leads for the phases. Preferably, insulation displacement connectors (IDCs) manufactured by Tyco are used with the disclosed stator assembly 10 and end caps 50. Excess portions of the interconnect wire as well as the posts 148 on the outboard side of the stator 10 are trimmed, and the stator 10 may be positioned in a shell.

Final assembly steps involve connecting power leads to the stator assembly. For a three phase machine, for example, ¼-inch IDCs can be inserted into three of the IDC pockets IDC+ on the lead end caps 50, such as those on the end caps of segments S-1, S-2, and S-3. Terminal connectors on the ends of three power leads can then be connected to these ¼-inch IDCs. Finally, the power leads can be attached to the stator assembly using poke-in tie wraps having ends that insert into the holes (66 in FIG. 12D) in the lead end caps 50.

H. Scalloped Stator

In addition to the features disclosed above, the disclosed segmented stator 10 includes additional features related to the contour of the stator 10, oil cooling and draining, material efficiency, and uniform fit of the stator 10 in a shell. As discussed in the Background Section of the present disclosure, hermetic motors used in compressors have an oil pump on the bottom of the compressor, known as the oil sump. Typically, the oil is pumped up through a hollow in the rotor shaft, past the motor, and to the main bearing. After lubricating the main bearing, the oil is let loose on the lead-end or "topside" of the motor to drain back to the oil sump.

Returning oil is substantially prevented from returning through the bore 11 of the stator 10 due to the winding coils 92 and the rotating rotor. Therefore, the outboard contour of the stator 10 can play a significant role in how the oil is allowed to return to the oil sump from the lead-end of the motor. If there is not enough drain area in the motor, for example, the oil can become dammed on the topside of the motor, causing higher oil circulation in the refrigeration system, starvation of oil to the pump, and poor performance of the compressor due to the compression of oil rather than gas in the system. On the other hand, if there is too much drain area in the stator, then the stator may be formed with less stator back iron than desired, which can create higher magnetic flux saturation in the stator core and can reduce the performance of the motor.

Figure 13:
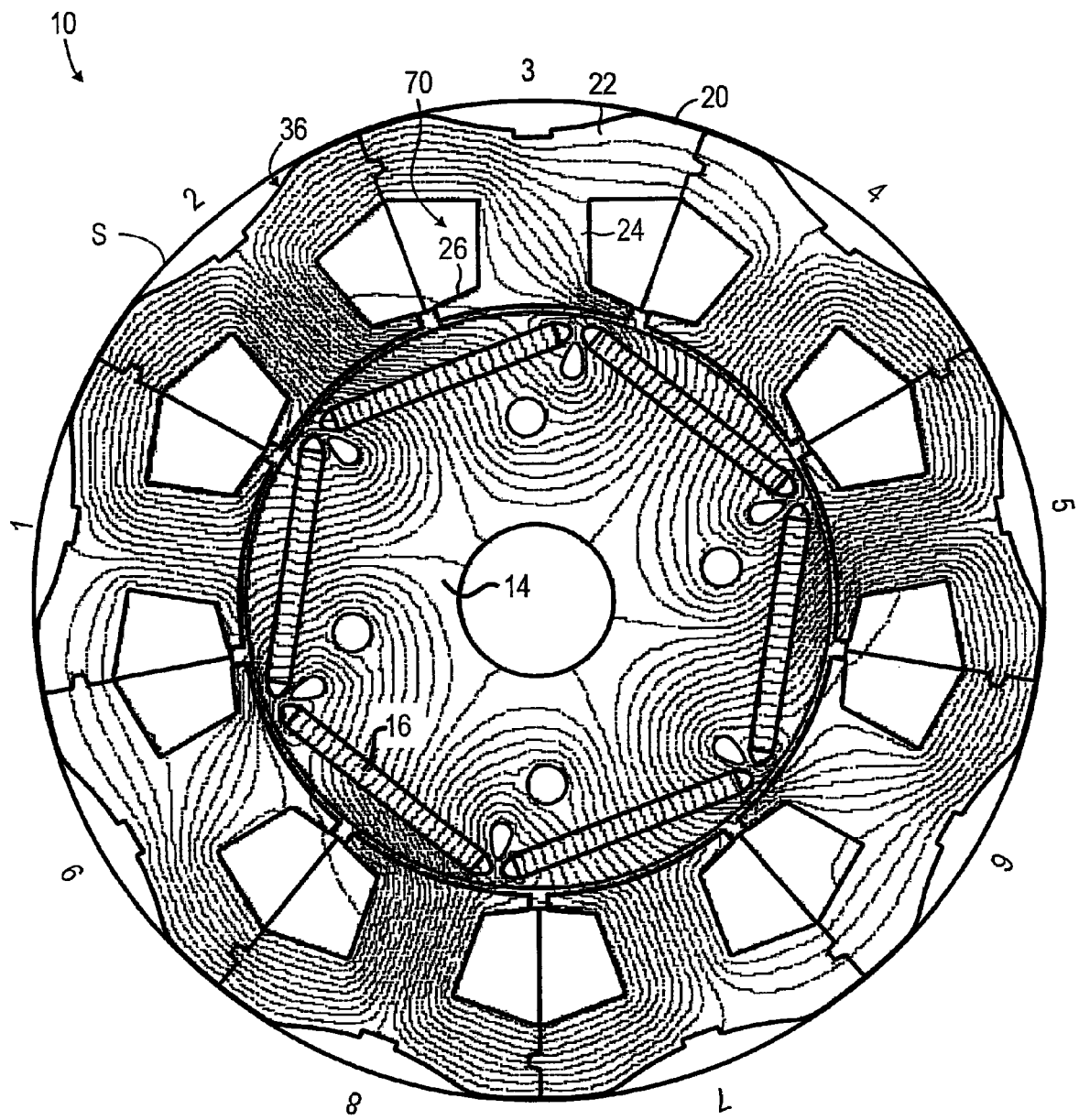
FIG. 13 schematically illustrates flux density paths on an example of the disclosed stator assembly.

Referring to FIG. 13, flux density paths are schematically illustrated on an exemplary embodiment of the disclosed segmented stator 10 according to certain teachings of the present disclosure. In the present example, the disclosed stator 10 includes nine segments 20. The segments 20 are electrically connected together into the annular shape of the stator 10 and contained in a shell S, which is shown in outline in the FIG. 13. The segments 20 have winding coils (not shown) that are wound about their tooth portions 24 and that are separated by insulation material, such as plastic strips. The pole ends 26 of the segments 20 define a bore 11, and a rotor 14 is positioned within the bore 11 for rotation relative to the stator 10. In the present embodiment, the rotor 14 includes a plurality of interior permanent magnets 16 and can be similar to the rotors disclosed in U.S. patent application Ser. No. 10/229,506, entitled "Permanent Magnet Machine" and filed Aug. 28, 2002, which is incorporated herein by reference in its entirety.

Each segment 20 of the stator assembly 10 in the present embodiment includes features for oil draining. In contrast to the use of flat portions or cutaways on the outside of a stator as is typically done in the prior art, each segment 20 defines a scalloped contour 36 formed in the outside edge 30 of the segment. Consequently, the disclosed stator 10 formed from the plurality of segments 20 has a plurality of such scalloped contours 36 arranged symmetrically around the outside of the stator 10. The scalloped contours 36 in the segments 20 of the stator 10 provide a symmetrical drain area around the circumference of the stator 10 and shell S for oil to drain past the motor. The symmetrical drain area may also provide the additional benefit of uniform motor cooling.

Figure 14:
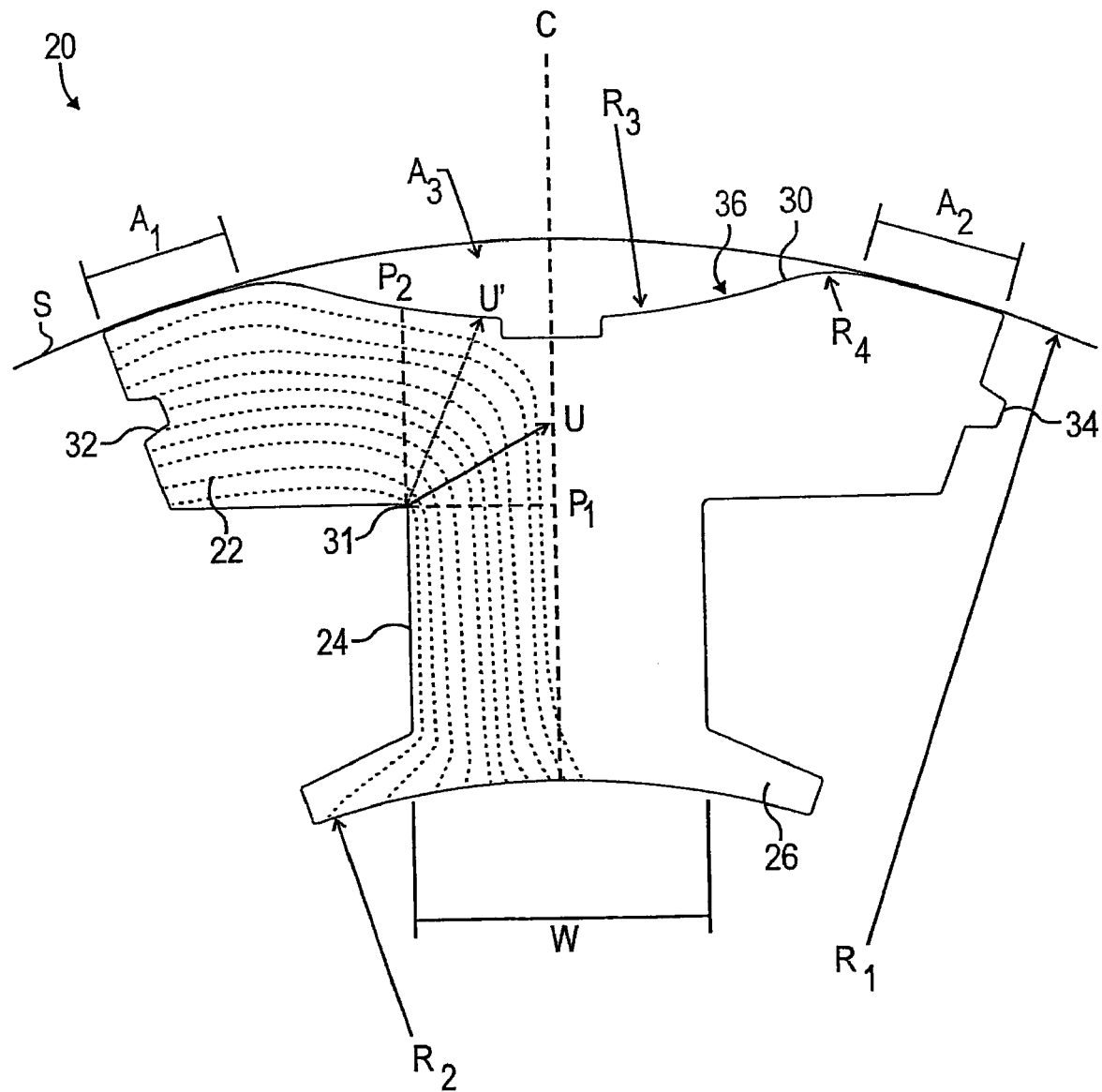
FIG. 14 illustrates a plan view of the disclosed segment relative to a circumference of a shell.

Referring to FIG. 14, an embodiment of a segment 20 for the disclosed stator assembly is shown in plan view relative to the circumference of the shell S. The circumference of the shell S is defined by a large radius $R_1$, and the pole end 26 of the segment 20 is defined by a smaller, concentric radius $R_2$. The tooth portion 24 of the segment 20 has a width W. Preferably, the scalloped contour 36 is defined in the outboard edge 30 of the segment 20 by a third radius $R_3$. The segment 20 is preferably symmetrical about a central line C, except for the ridged and slotted ends 32 and 34.

1. Contact Area

The amount of contact area between the stator 10 and the circumference of the shell S is one concern in designing the scalloped contour 36 of the disclosed segment 20. In FIG. 13, for example, at least a minimum contact area is required between the outboard edges 30 of the plurality of segments 20 and the shell S that holds the stator 10 in place. Typically, the contact area of about 18-25% of the total circumference of the shell S is desired to hold the stator 10 in place. As shown in FIG. 14, the outboard edge 30 of the disclosed segment 20 contacts the circumference of the shell S with a contact area $A_1+A_2$. Therefore, the scalloped contour 36 is preferably formed in the segment 20 so that the contact area $A_1+A_2$ between the outboard edge 30 and the circumference of the shell S is about 18-25% of the entire angular expanse of the segment 20. In this way, the stator 10 of FIG. 13 formed from the plurality of segments 20 can have the desired contact area between the outboard edges 30 and the shell S, and the radius $R_3$ of the scalloped contours 36 as shown in FIG. 14 can also be selected to maximize the drain area $A_3$ provided by the contour 36.

2. Shell Deformation

Returning to FIG. 13, potential deformation of the shell S by the stator 10 is another concern in designing the scalloped contours 36 on the segments 20. Being symmetrical about the circumference of the stator 10, the scalloped contours 36 of the segments 20 can give a superior fit between the stator 10 and shell S. Furthermore, the scalloped contours 36 being symmetrical about the circumference of the stator 10 can equally deform the shell S if potential deformation occurs. As noted in the Background Section of the present disclosure, the prior art that uses flat portions around the outboard edge of a stator. Unlike the prior art, the symmetrically arranged scalloped contours 36 on the stator 10 reduce the flat length of the stator 10 that can interferes with the shell S, which can reduces undesirable deformation of the shell S. As best shown in FIG. 14, the scalloped contour 36 in the segment 20 preferably has sweeping radii $R_4$ on both ends of the contour 36 where it meets with the outside edge 30 that contacts the shell S. The sweeping radii $R_4$ substantially removes sharp edges on the outboard edge 30 of the segment 20 and can potentially reduce deformation of the shell S.

3. Flux Density

In the example alignment between the rotor 14 and stator 10 shown in FIG. 13, the segments S-2, S-5, and S-8 have concentrated flux paths. Maintaining a sufficient amount of back iron on the stator 10 to avoid flux saturation in the segments 20 is yet another concern when designing the scalloped contours 36 of the stator 10. As noted above, prior art solutions can reduce the amount of back iron on a stator needed for desired performance of a motor. Not only does the present embodiment of the scalloped contours 36 give more oil drain area and substantially reduce shell deformation, but the disclosed scalloped contours 36 substantially maintain the back iron in the segments 20 at a preferred level.

In FIG. 14, the segment 20 is shown with the central line C that symmetrically divides the segment 20. A first line $P_1$ is shown from an inner corner 31 of the tooth portion 24 to the central line C of the segment 20 and is substantially perpendicular to the central line C. A second line $P_2$ is shown from the inner corner 31 to the edge 30 of the segment 20 and is substantially parallel to the central line C. Flux paths are schematically shown in FIG. 14 passing through the first and second lines $P_1$ and $P_2$ as the flux paths pass around the corner 31 between the tooth portion 24 and the end 32 of the segment 20. The first line $P_1$ defines a cross-sectional area represented by half of the width W of the tooth portion 20.

To avoid issues with saturation, the second line $P_2$ preferably defines a cross-sectional area at least equal to that defined by the first line $P_1$. The flux paths are also shown in FIG. 14 passing through arbitrary lines U and U' that extend from the corner 31 of the segment 20 to the central line C and the scalloped contour 36. To avoid issues with saturation, these arbitrary lines U and U' preferably define cross-sectional areas at least equal to that defined by the first line $P_1$. In this way, the scalloped contour 36 is formed in the segment 20 so that the portion of the segment 20 between the corner 31 and the scalloped contour 36 has a sufficient amount of back iron for the flux passing between the tooth portion 24 and the ends 32 and 34 of the segment 20.

I. Drain Holes in Lead End Caps

Returning again to FIGS. 6A through 6F, the lead end cap 50 in the present embodiment also includes features for oil cooling and draining. As best shown in FIG. 6B, the body portion 60 on the lead end cap 50 defines the cavity 61 for molding purposes because the end cap 50 is injection molded from plastic. The body portion 60 also defines the mounting hole 66 for a cable tie (not shown). Not all of the mounting holes 66 on the lead end caps 50 on the completed stator assembly will have a cable tie attached. For example, on the exemplary three-phase motor, only three cable ties will be coupled in mounting holes 66. Thus, a number of open mounting holes 66 will expose the cavities 61 of the end caps 50. Because the motor in a hermetic compressor application is in an oil environment, oil can pass into the cavity 61 of the end cap 50 through the mounting hole 66 when the cable tie is absent. Also, oil can pass through other holes in the end cap 50, such as the alignment holes 146 or window 125 best shown in FIGS. 6A and 6B. Consequently, oil can collect in the cavity 61 of the end cap 50 and can accumulate on the lead-end of the stator, which is undesirable.

To prevent the collection of oil, the disclosed end cap 50 includes drain holes 67 along the bottom edge of the end cap 50. Oil drawn into the cavity 61 from the exposed mounting hole 66 or other holes in the top of the end cap 50 can drain out the bottom of the end cap 50 through the drain holes 67. The drain holes 67 substantially eliminate any pooling of oil on the lead-end of the stator segments 20 and on the top of the end cap 50. The drain holes 67 can reduce the amount of oil caused to circulate through the compressor system by letting some of the oil to flow through the end cap 50 rather than traveling down through the bore of the stator 10. When oil travels through the bore of the stator, the spinning motion of the rotor can force the oil back up to the top end of the compressor where the oil is then picked up by the flow of gas and circulated through the refrigeration system. Although the drain holes 67 offer a small path for returning oil to the oil sump of a compressor, it has been found that the drain holes 67 on end caps 50 of a stator assembly 10 may prevent about 1-2 ounces of oil from pooling in the end caps 50 if the drain holes 67 were not provided. In addition, it is believed that the drain holes 67 can aid in cooling of the winding coil on the segments by facilitating the drain of oil. Moreover, the drain holes 67 at the bottom edge of the end cap 50 also beneficially act as relief areas for the interlock tabs (element 37 in FIG. 3A) on the segment.

As used herein and the appended claims, reference to words, such as top, bottom, above, below, inboard, outboard, lead-end, base-end, etc. have been used merely for clarity to show the relative locations of components on the disclosed end caps and stator assembly. Such words of relative location do not limit the orientation of the components and do not limit the overall orientation or operation of the disclosed end caps and stator in a motor.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An end cap of an electromagnetic machine having a stator with a plurality of adjacent segments, the end cap including a body portion configured for positioning on a yoke portion of one of the adjacent segments, the body portion having first and second ends and first and second snap couplings on the first and second ends, respectively, the first and second snap couplings configured to snap couple to ends on adjacent like end caps to substantially interlock and hold the adjacent segments together, wherein the first snap coupling includes a recess into which a portion of the first snap coupling can deflect.

2. An end cap of an electromagnetic machine having a stator with a plurality of adjacent segments, the end cap including a body portion configured for positioning on a yoke portion of one of the adjacent segments, the body portion having first and second ends and first and second snap couplings on the first and second ends, respectively, the first and second snap couplings configured to snap couple to ends on adjacent like end caps to substantially interlock and hold the adjacent segments together, wherein the first snap coupling is configured to deflect in a direction substantially perpendicular to a movement direction of the first snap coupling when the first snap coupling engages the second snap coupling of a like adjacent end cap.

3. An end cap of an electromagnetic machine having a stator with a plurality of adjacent segments, the end cap including a body portion configured for positioning on a yoke portion of one of the adjacent segments, the body portion having first and second ends and first and second snap couplings on the first and second ends, respectively, the first and second snap couplings configured to snap couple to ends on adjacent like end caps to substantially interlock and hold the adjacent segments together, wherein a portion of the first snap coupling is configured to deflect toward a centerline of the first snap coupling.

4. An end cap of an electromagnetic machine having a stator with a plurality of adjacent segments, the end cap including a body portion configured for positioning on a yoke portion of one of the adjacent segments, the body portion having first and second ends and first and second snap couplings on the first and second ends, respectively, the first and second snap couplings configured to snap couple to ends on adjacent like end caps to substantially interlock and hold the adjacent segments together, the first snap coupling including a male member and the second snap coupling including a female member, the female member including an opening and a guide structure for deflecting a portion of the male member of a like adjacent end cap toward a center of the opening when the first snap coupling of the like adjacent end cap engages the second snap coupling.

5. An end cap of an electromagnetic machine having a stator with a plurality of adjacent segments, the end cap including a body portion configured for positioning on a yoke portion of one of the adjacent segments, the body portion having first and second ends and first and second snap couplings on the first and second ends, respectively, the first and second snap couplings configured to snap couple to ends on adjacent like end caps to substantially interlock and hold the adjacent segments together, the first snap coupling including a male member and the second snap coupling including a female member, the female member including a slot having an open side and a closed side, the slot decreasing in width for at least a portion of a distance from the open side to the closed side.

6. An end cap of an electromagnetic machine having a stator with a plurality of adjacent segments, the end cap including a body portion configured for positioning on a yoke portion of one of the adjacent segments, the body portion having first and second ends and first and second snap couplings on the first and second ends, respectively, the first snap coupling including a male member and the second snap coupling including a female member, the first and second snap couplings configured to snap couple to ends on adjacent like end caps to substantially interlock and hold the adjacent segments together, wherein the male member includes a bifurcate catch.

7. An electromagnetic machine, comprising:
   a stator having a plurality of adjacent segments;
   a plurality of end caps, each end cap having a body portion positioned on a yoke portion of one of the adjacent segments and having first and second ends; and
   means for snap coupling the first and second ends of the adjacent end caps to substantially interlock and hold the adjacent segments together, said means including a male member having a recess into which a portion of the male member can deflect.

8. An end cap of an electromagnetic machine having a stator with a plurality of adjacent segments, the end cap configured for positioning on one of the adjacent segments and having first and second ends configured for snap coupling to ends on adjacent end caps to substantially interlock and hold the adjacent segments together, said first end including a deformable male member and said second end including a female member, the deformable male member configured for snap fitting with the female member of one of the adjacent end caps, wherein the deformable male member includes a recess into which a portion of the deformable male member can deflect.

9. An end cap of an electromagnetic machine having a stator with a plurality of adjacent segments, the end cap including a body portion configured for positioning on a yoke portion of one of the adjacent segments, the body portion having first and second ends and first and second snap couplings on the first and second ends, respectively, the first and second snap couplings configured to snap couple to ends on adjacent like end caps to substantially interlock and hold the adjacent segments together, wherein said one of the segments has a surface on which the end cap is positionable, and wherein the end cap further comprises:
   a slot defined in the first end and having an open side for exposing the surface of the segment, and
   a finger extending from the second end and having a side substantially positionable on the same plane as the surface of the segment,
   wherein the finger fits within the slot on an adjacent like end cap with the side of the finger positioned against the surface of the adjacent segment so that the surfaces of the adjacent segments lie substantially on the same plane.

10. A method of assembling a stator for an electromagnetic machine, the stator having a plurality of segments and a plurality of end caps, the method comprising:
   a) positioning an end cap on each of the segments, each end cap having a body portion for engaging a yoke portion of one of the segments, the body portion having opposite ends and snap couplings on the opposite ends, the snap couplings including a male member and a female member, the male member including a recess into which a portion of said male member can deflect;
   b) positioning ends of the segments adjacent one another; and
   c) substantially interlocking and holding the ends of the adjacent segments together by snap coupling said ends of the adjacent end caps together, including mating the male and female members on the ends of the adjacent end caps.

* * * * *